(12) United States Patent
Kies et al.

(10) Patent No.: US 11,765,318 B2
(45) Date of Patent: *Sep. 19, 2023

(54) PLACEMENT OF VIRTUAL CONTENT IN ENVIRONMENTS WITH A PLURALITY OF PHYSICAL PARTICIPANTS

(71) Applicant: QUALCOMM Incorporated, San Diego, CA (US)

(72) Inventors: Jonathan Kies, Encinitas, CA (US); Robert Tartz, San Marcos, CA (US); Daniel James Guest, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 17/471,802

(22) Filed: Sep. 10, 2021

(65) Prior Publication Data

US 2022/0006973 A1 Jan. 6, 2022

Related U.S. Application Data

(63) Continuation of application No. 16/572,030, filed on Sep. 16, 2019, now Pat. No. 11,159,766.

(51) Int. Cl.
*H04N 7/14* (2006.01)
*G06T 7/73* (2017.01)
(Continued)

(52) U.S. Cl.
CPC .......... *H04N 7/147* (2013.01); *A63F 13/332* (2014.09); *G06T 7/73* (2017.01); *G06T 19/006* (2013.01); *H04N 7/142* (2013.01); *H04N 13/122* (2018.05)

(58) Field of Classification Search
CPC .. H04N 7/15; H04N 1/42; H04N 7/14; H04N 13/122; H04N 7/147; G02B 27/0172; G02B 27/0101; G06T 7/73; G06T 19/00
(Continued)

(56) References Cited

U.S. PATENT DOCUMENTS 6,034,652 A 3/2000 Freiberger et al.
8,839,121 B2 9/2014 Bertolami et al.
(Continued)

FOREIGN PATENT DOCUMENTS

WO 2013106133 7/2013
WO 2014136700 A1 9/2014
WO 2017021902 A1 2/2017

OTHER PUBLICATIONS

International Preliminary Report on Patentability—PCT/US2018/038509, The International Bureau of WIPO—Geneva, Switzerland, Jan. 30, 2020.
(Continued)

*Primary Examiner* — Yosef K Laekemariam
(74) *Attorney, Agent, or Firm* — QUALCOMM Incorporated

(57) ABSTRACT

A device may be configured to determining display properties for virtual content in an environment with a plurality of physical participants by capturing an image of the environment, analyzing the captured image to identify at least one object in the environment, determining a parameter for the identified object, and determining a display property of a digital representation of virtual content based on the determined parameter. Embodiments may include negotiating display properties with other devices to generate coordinated display properties, and rendering the digital representation of the virtual content so that the remote participant appears
(Continued)

to be in the same fixed position to all co-located participants and sized consistent with the co-located participants.

29 Claims, 13 Drawing Sheets

(51) Int. Cl.
*H04N 13/122* (2018.01)
*G06T 19/00* (2011.01)
*A63F 13/332* (2014.01)

(58) Field of Classification Search
USPC .......... 348/14.01, 14.08, 14.09, 14.1, 211.12
See application file for complete search history.

(56) References Cited

U.S. PATENT DOCUMENTS

| | | | |
|---|---|---|---|
| 9,563,265 | B2 | 2/2017 | You et al. |
| 9,645,394 | B2 | 5/2017 | Kinnebrew et al. |
| 10,271,033 | B2 | 4/2019 | Kamal et al. |
| 10,304,239 | B2 | 5/2019 | Gorur et al. |
| 10,825,237 | B2 | 11/2020 | Gorur Sheshagiri et al. |
| 2003/0046689 | A1 | 3/2003 | Gaos |
| 2004/0189675 | A1 | 9/2004 | Pretlove et al. |
| 2005/0245302 | A1* | 11/2005 | Bathiche ............... A63F 13/213 |
| | | | 434/335 |
| 2010/0182220 | A1 | 7/2010 | Bathiche et al. |
| 2010/0306021 | A1 | 12/2010 | O'Connor et al. |
| 2010/0306825 | A1 | 12/2010 | Spivack |
| 2011/0096093 | A1 | 4/2011 | Oi et al. |
| 2012/0113223 | A1 | 5/2012 | Hilliges et al. |
| 2012/0293506 | A1 | 11/2012 | Vertucci et al. |
| 2014/0204002 | A1 | 7/2014 | Bennet et al. |
| 2014/0347391 | A1 | 11/2014 | Keane et al. |
| 2014/0368537 | A1* | 12/2014 | Salter ...................... G06F 3/011 |
| | | | 345/633 |
| 2015/0123966 | A1 | 5/2015 | Newman |
| 2015/0213650 | A1 | 7/2015 | Barzuza et al. |
| 2016/0025981 | A1* | 1/2016 | Burns ................ G06F 3/04815 |
| | | | 345/156 |
| 2016/0180581 | A1 | 6/2016 | Jones |
| 2016/0253842 | A1 | 9/2016 | Shapira et al. |
| 2016/0260251 | A1 | 9/2016 | Stafford et al. |
| 2018/0036641 | A1 | 2/2018 | Parisi |
| 2018/0300040 | A1 | 10/2018 | Mate et al. |
| 2019/0026936 | A1 | 1/2019 | Gorur et al. |
| 2019/0236835 | A1 | 8/2019 | Gorur Sheshagiri et al. |
| 2019/0253667 | A1 | 8/2019 | Valli |
| 2021/0005012 | A1 | 1/2021 | Gorur Sheshagiri |
| 2021/0084259 | A1 | 3/2021 | Kies et al. |
| 2022/0101594 | A1 | 3/2022 | Gorur Sheshagiri et al. |

OTHER PUBLICATIONS

International Search Report and Written Opinion—PCT/US2018/038509—ISA/EPO—dated Oct. 16, 2018.
International Search Report and Written Opinion—PCT/US2020/050309—ISA/EPO—dated Nov. 20, 2020.
Taiwan Search Report—TW109131341—TIPO—dated Mar. 11, 2022.

* cited by examiner

PLACEMENT OF VIRTUAL CONTENT IN ENVIRONMENTS WITH A PLURALITY OF PHYSICAL PARTICIPANTS

CROSS-REFERENCE TO RELATED APPLICATIONS

This application is a continuation of U.S. application Ser. No. 16/572,030, filed Sep. 16, 2019, entitled "Placement of Virtual Content in Environments with a Plurality of Physical Participants," which is hereby incorporated herein by reference in their entirety and for all purposes.

BACKGROUND

In recent years, software applications that render images and virtual content within an environment have been growing in popularity and the variety of uses, such as electronic gaming, virtual training systems, collaborative work environments, advanced web-based conferencing and screen-sharing applications. In addition, advances in mobile device technologies now allow mobile device users to execute powerful software applications on their mobile devices, such as augmented reality software applications that combine real world images from a user's physical environment with computer-generated imagery or virtual content. For example, an augmented reality application may add graphics, sounds, and/or haptic feedback to the natural world that surrounds a user of the application. Images, video streams and information about people and/or objects may be presented to the user on a wearable electronic display (e.g., smart glasses, augmented reality glasses, etc.) so that the user can view and/or interact with representations of the real-world people or objects.

Due to these trends, it is expected that augmented reality applications will allow users to collaborate and interact with others in remote locations as if all the participants are located in the same environment (e.g., in the same room). For example, an augmented reality application may render the remote participants as three-dimensional representations or a two-dimensional video or an avatar so that the local and remote participants may interact and communicate in the same manner as they would if all the participants were in the same environment.

SUMMARY

Various aspects of the disclosure provide methods of determining display properties for virtual content in an environment with a plurality of participants, which may include capturing, by a processor, an image of the environment, analyzing the captured image to identify an object in the environment, determining a parameter for the identified object, and determining a display property of a digital representation of virtual content based on the determined parameter. In some aspects, the processor may be a processor of a smartphone of one of the plurality of participants.

Some aspects may include assigning a priority to the determined parameter. In some aspects, determining the display property of the digital representation of the virtual content based on the determined parameter may include determining the display property of the digital representation of the virtual content based on the priority assigned to the determined parameter.

In some aspects, determining the parameter for the identified object may include determining at least one or more of a fixed position parameter, a size parameter, or a line-of-sight parameter, and determining at least one or more of a field-of-view parameter, a spacing parameter, an inter-person distance parameter, a height parameter, and a visibility parameter. In some aspects, assigning a priority to the determined parameter may include assigning a first priority to the fixed position parameter, the size parameter, or the line-of-sight parameter, and assigning a second priority to the field-of-view parameter, the spacing parameter, the inter-person distance parameter, the height parameter, or the visibility parameter, in which the first priority is a higher priority than the second priority.

Some aspects may include identifying one or more other devices in the environment, and sending the determined parameters to the identified one or more other devices. Some aspects may include receiving an additional parameter from at least one other device in the environment, in which determining the display property of the digital representation of the virtual content based on the determined parameter may include determining one or more display properties of the digital representation of the virtual content based on the determined parameter and the received additional parameter.

In some aspects, determining the display property of the digital representation of the remote participant based on the determined parameter may include negotiating one or more display properties for rendering the digital representation of the remote participant with at least one other device in the environment to generate one or more coordinated display properties. Some aspects may include using the one or more coordinated display properties to render the digital representation of the remote participant so that all co-located participants physically present in the environment perceive the remote participant to be in the same fixed position in the environment. Some aspects may include using the one or more coordinated display properties to size the digital representation of the remote participant based on a size of a participant physically present in the environment. Some aspects may include using the one or more coordinated display properties to render the digital representation of the remote participant so that the remote participant appears to be positioned between a first participant physically present in the environment and a second participant physically present in the environment.

In some aspects, using the one or more coordinated display properties to render the digital representation of the remote participant so that the remote participant appears to be positioned between the first participant physically present in the environment and the second participant physically present in the environment may include using the coordinated display properties to render the digital representation of the remote participant so that the remote participant appears to be approximately equidistant to the first participant physically present in the environment and the second participant physically present in the environment.

Some aspects may include using the one or more coordinated display properties to render the digital representation of the remote participant so that the remote participant appears to be anchored to an empty seat. Some aspects may include capturing an updated image of the environment, analyzing the captured updated image to determine whether a number, location, position, or size of the identified object has changed, determining an updated parameter for the identified object in response to determining that the location, position, or size of the identified object has changed, determining whether a difference between the determined parameter and the determined updated parameter exceeds a threshold value, and determining an updated display property for the digital representation of the remote participant in response to determining that the difference between the determined parameter and the determined updated parameter exceeds the threshold value.

In some aspects, determining the display property of the digital representation of the remote participant based on the determined parameter may include determining at least one display property for each digital representation of each of a plurality of remote participants. In some aspects, capturing the image of the environment may include capturing, by a processor associated with a device (e.g., computing device, mobile device, head mounted device, etc.), the image of the environment. In some aspects, determining the parameter for the identified object may include determining at least one or more of a fixed position parameter, a size parameter, a line-of-sight parameter, a field-of-view parameter, a spacing parameter, an inter-person distance parameter, a height parameter, or a visibility parameter. In some aspects, the virtual content may be a remote participant. In some aspects, the virtual content is related to a game. In some aspects, the environment may be an augmented reality game environment.

Further aspects may include a computing device that is equipped with a processor that is configured with processor-executable instructions to perform operations of any of the methods summarized above, such as capturing an image of an environment, analyzing the captured image to identify at least one object in the environment, determining a parameter for the identified object, and determining a display property of a digital representation of a remote participant based on the determined parameter. Further aspects may include a device that includes an image sensor, a projector configured to project images onto optical lenses, and a processor coupled to the image sensor and projector, and configured with processor-executable instructions to perform operations of any of the methods summarized above, such as capturing an image of an environment, analyzing the captured image to identify at least one object in the environment, determining a parameter for the identified object, and determining a display property of a digital representation of a remote participant based on the determined parameter.

Further aspects may include a non-transitory processor-readable storage medium having stored thereon processor-executable instructions configured to cause a processor in a device and/or in an associated computing device to perform operations of any of the methods summarized above. Further aspects may include a device and/or associated computing device having various means for accomplishing the functions of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

In overview, the various embodiments include methods, and devices (e.g., computing device, mobile device, head mounted device, etc.) configured to implement the methods, for determining display properties for virtual content in environments with a plurality of physical participants. For example, a mobile device or a head mounted device may be configured to capture an image of an environment (e.g., game room, meeting area, playing field, etc.), analyze the captured image to identify at least one object in the environment, determine a parameter for the identified object, and determine a display property of a digital representation of a remote participant based on the determined parameter.

The term "mobile device" is used herein to refer generally to any one or all of smartphones, cellular telephones, Internet-of-things (TOT) devices, personal or mobile multimedia players, laptop computers, tablet computers, ultrabooks, palm-top computers, wireless electronic mail receivers, multimedia Internet enabled cellular telephones, wireless gaming controllers, head mounted devices, and similar electronic devices which include a programmable processor, a memory and circuitry for sending and/or receiving wireless communication signals to/from wireless communication networks. While the various embodiments are particularly useful in mobile devices, such as smartphones and tablets, the embodiments are generally useful in any electronic device that includes communication circuitry for accessing cellular or wireless communication networks.

The phrase "head mounted device" and its acronym "HMD" may be used interchangeably herein to refer to any electronic display system that presents the user with a combination of computer-generated imagery and real-world images from a user's physical environment (i.e., what the user would see without the glasses) and/or enables the wearer/user to view the generated image in the context of the real-world scene. As examples, a head mounted device may be, may include, or may be included in, a helmet, eyeglasses, virtual reality glasses, augmented reality glasses, electronic goggles, and other similar technologies/devices. In some embodiments, a head mounted device may include a processor, a memory, a display, a camera, and a wireless interface for connecting with the Internet, a network, or another computing device.

Figure 1A:
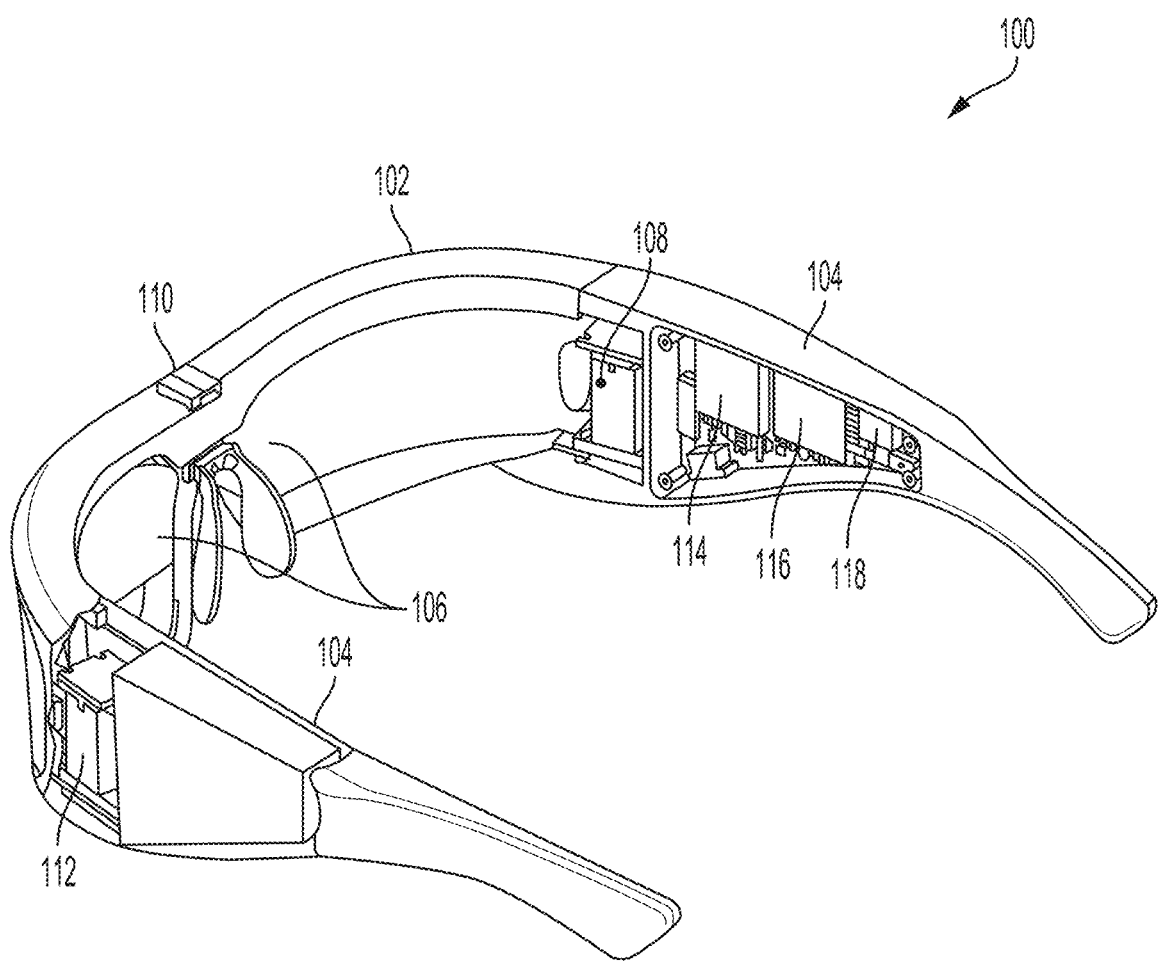
FIG. 1A is an illustration of a head mounted device (e.g., augmented reality glasses) that may be configured to implement various embodiments.
Figure 1B:
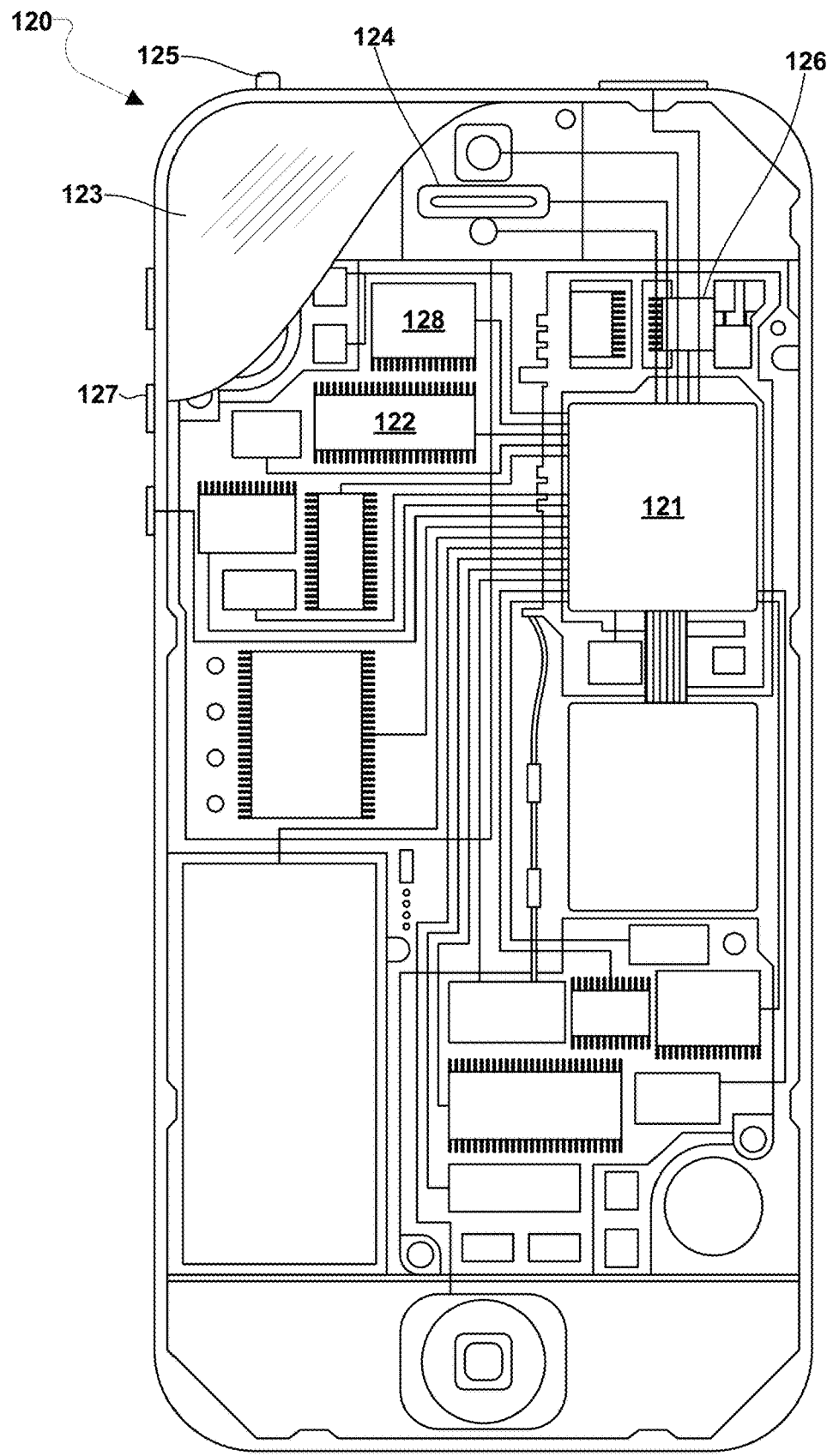
FIG. 1B is a component block diagram of smartphone suitable for implementing some embodiments.
Figure 11:
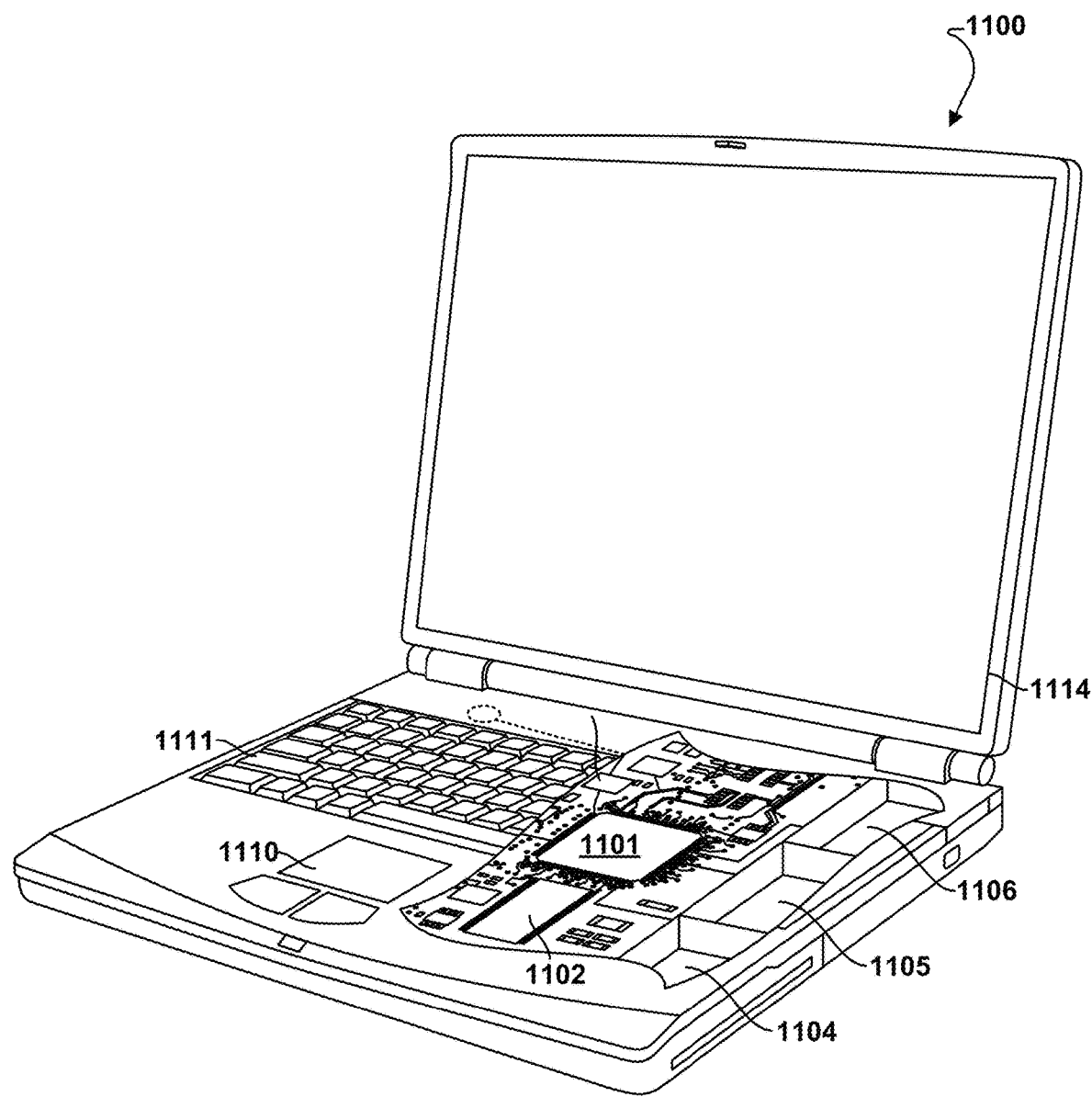
FIG. 11 is a component diagram of example computing device suitable for use with the various embodiments.

In some embodiments a head mounted device may be an accessory for and/or receive video from another computing device (e.g., desktop, laptop, Smartphone, tablet computer, etc.), with all or portions of the processing being performed on the processor of the other computing device (e.g., the computing devices illustrated in FIGS. 1B and 11, etc.). As such, in various embodiments, the head mounted device may be configured to perform all processing locally on the processor in the head mounted device, offload all of the main processing to a processor in another computing device (e.g. a laptop present in the game room, etc.), or split the main processing operations between the processor in the head mounted device and the processor in the other computing device. Further, in situations in which there are multiple head mounted devices present (e.g., in a meeting with several participants present) and/or multiple computing devices present (e.g., multiple smartphone, mixtures of smartphones, tablets and laptop computers), main processing operations may be performed in a distributed manner with the present head mounted devices and/or computing devices may exchanging data and computational results via wireless communications (e.g., Bluetooth, WiFi, LTE-Direct, etc.)

The term "environment" is used herein to refer generally to a visible context in which participants may appear, in reality and virtually. An environment may include a physical location of the local participants. Non-limiting examples of physical environments include a game room, a control room, a classroom, a training facility, a playing field (e.g., for a game), etc. In some embodiments, an environment may include a virtual location, such as an electronic game domain, in which all participants appear virtually. For example, the environment may be the virtual space within which participants interact in an augmented reality board game.

The phrases "remote participant" and virtual content are used herein to refer to a person or a digital representation of a person that is projected to appear in the same virtual environment and who interacts with others but is not physically present in the same physical environment (e.g., same playing field, meeting room, etc.) as the other participants. The phrase "co-located participant" is used herein to refer to a person (or a device held or worn by the person) who is physically present in the same environment as at least one other participant. In the following descriptions and the claims reference may be made to "virtual content," "a remote participant" and "the remote participant," however such references are for ease of description and the various embodiments are not limited to rendering a virtual presence for a single participant. Rather, the methods and operations of the various embodiments may be used to position and render any number of remote participants. Similarly, the various embodiments may work with any number of co-located participants. Further, the various embodiments may be implemented in applications in which all participants are remote participants, such as in virtual gaming applications. Further, the "remote participant" may be an image of a virtual participant, such as an avatar, a computer-generated image of a person performing a role in a virtual reality game. To encompass the various types of images of individuals not physically present, the term "virtual content" may be used to refer to a virtual participant in the descriptions and the claims.

People are increasingly using their devices (e.g., smartphones, mobile device, head mounted device, etc.) to conduct or interact with other in augmented reality applications, such as augmented reality games, augmented reality training, virtual meetings, etc. A popular use of augmented reality games, which may be played on participants' smartphones, which show images of individual that are not physically present, but appear presented in images on the smartphone as in actual appearance (e.g., as image via a camera on the smartphone) or in a virtual appearance (e.g., an avatar). Also, augmented reality systems are revolutionizing training of operators of sophisticated equipment, such as complex control rooms, war rooms, aircraft cockpits, robotic surgery environments, and enabling local and remote individuals to participate in the same training sessions can dramatically improve team training efficiency and cost effectiveness. Further, it is no longer necessary for all participants in a meeting to be physically present in order to interact with others as if all were in the same game room, as augmented reality systems can be used to present images of all participants as if in the same environment.

Smartphones, modern virtual reality displays and image capture devices may improve productively and facilitate interactions between the local and remote participants in various types of group engagements (e.g., augmented reality games, group chats, meetings, group training, lectures, etc.) by rendering digital representations of remote participants in virtual reality displays so that the remote participants appear to be in the same environment as the user/wearer of the user device. Yet, for virtual group engagements (e.g., augmented reality games, meetings, etc.) in which two or more co-located participants are physically present in the same environment (e.g., seated before the same physical gameboard, in the playing field, same room, area, control center, etc.), any improvements in productivity or user-interactions provided by the user device (e.g., a smartphone) could be negated if the user device does not intelligently select the location and/or position in which the digital representations of virtual content, such as remote participants, are rendered. For example, if the placement of a digital representation of a remote participant is not consistent in the user devices (e.g., smartphones) of each of the co-located participants, each co-located participant may face/look a different direction when talking or listening to virtual content, such as a remote participant. This could be confusing, distracting, disruptive, and/or otherwise hinder the natural human-to-human communications between the participants.

Generally, to facilitate natural human-to-human communications, it may be beneficial for the user devices to place the virtual content (e.g., digital representations of remote participants, etc.) in a fixed position that is the same from the perspective of all participants, including co-located participants when some participants are physically present in the same environment. For example, if the digital representation of virtual content (e.g., a remote participant) is placed in a certain position at a game table by one user device, all of the other user devices of the co-located participants may render the digital representation of the remote participant in that same position. In addition, it may be beneficial for the user devices to intelligently size the digital representation of the remote participant so that the remote participant does not appear too big, too small, or otherwise unnatural to the co-located participants. For example, the digital representation of the virtual content (e.g., remote participant) may be sized to appear to be approximately the same size in smartphone displays as co-located participants. Further, it may be beneficial for the user devices to render the digital representation of a remote participant so that the remote participant is placed at a proper height relative to the co-located participants, is within the field-of-view of the co-located participants, does not block the line-of-sight of another participant, is appropriately spaced (e.g., all participants appear approximately equidistant, etc.), accounts for inter-person distance (e.g., is not rendered so close to another participant so that it feels as though the person is encroaching on personal space boundaries, etc.), and is otherwise easily visible (e.g., is not placed in front of bright or complex background, etc.).

Various embodiments include an augmented reality software application configured to function in a user device (e.g., a smartphone), and/or user devices configured to facilitate natural human-to-human communications (e.g., for eye contact, normal turn taking, etc.) among local and remote participants and virtual content by intelligently determining the locations, positions, orientations, sizes and other display characteristics of the virtual content, such as digital representations of remote participants, to facilitate natural human-to-human communications (e.g., for eye contact, normal turn taking, etc.).

A device processor (e.g., a processor in a smartphone, in a head mounted device worn by a co-located participant, in a mobile device commutatively coupled to a head mounted device, etc.) may be configured to collaborate with other device processors (e.g., in smartphones, in head mounted devices worn by other co-located participants, etc.) to intelligently determine the display properties of a digital representation of virtual content, such as a remote participant. For example, the device processor may be configured to determine an environment, such as by rendering a virtual environment (e.g., an augmented reality gameboard, virtual game environment, etc.) or by capturing an image of an actual environment (e.g., a game table, a playing field, conference room, a control room, a training environment, etc.) via a camera of the user device. For actual environments, the device processor may analyze the captured image to identify people and objects (e.g., desk, table, chairs, walls, etc.) within the environment, capture or compute data (e.g., via a sensor array or processor). For virtual environments, the device processor may determine shapes and locations of various virtual objects in the environment. The device processor may compute various parameters for each of the identified objects based on the captured/computed data, and send the determined parameters to other device processors (e.g., sending the data via wireless data links to smartphones of other participants).

In some embodiments, the device processor may also be configured to use localization and mapping techniques, such as simultaneous localization and mapping (SLAM), visual simultaneous localization and mapping (VSLAM), and/or other techniques known in the art to create a grid map of the scene. The device processor may use the grid map to determine the position of virtual content, such as a remote participant, and/or share the grid map with other devices in the environment so that all device processors know where the virtual content should be placed in the environment.

The parameters computed and communicated by the device processor may include a fixed position parameter, a size parameter, a line-of-sight parameter, a field-of-view parameter, a spacing parameter, inter-person distance parameter, a height parameter, and/or a visibility parameter. Each of these parameters may be associated with one or more weights that indicate the importance of the parameter. For example, to accommodate a multi-party game with virtual content and many remote participants, a device processor may increase the weights associated with the fixed position parameter and/or decrease the weights associated with the size parameter. The device processor may also prioritize the parameters, giving a higher priority to the fixed position, size, and line-of-sight parameters than to the field-of-view, spacing, inter-person distance, height, and visibility parameters.

Each device processor may receive parameters computed by the other device processors, and use the received parameters in conjunction with the parameters computed on the device to coordinate or negotiate display properties for rendering the digital representation of virtual content, such as images of a remote participant.

Each device processor may use the coordinated display properties to render the digital representations of virtual content, such as images of a remote participant so that all the co-located participants (i.e., people physically present in the same physical environment) perceive the virtual content to be in the same location in the environment (e.g., gameboard, game room, game scene, conference room, control room, war room, equipment, etc.), anchored to the same physical object (e.g., a game piece, an empty chair, a console, etc.), and/or otherwise in a fixed position with respect to images of the environment.

The device processors may also be configured to use the coordinated display properties to intelligently size the digital representation so that virtual content, such as images of a remote participant, does not appear unnatural to the participants when viewed through their devices (e.g., smartphones), so that the virtual content is placed at a proper height relative to the co-located participants, is within the field-of-view of the co-located participants, does not block the line-of-sight of another participant, is appropriately spaced (e.g., all participants appear approximately equidistant, etc.), accounts for inter-person distance (e.g., is not rendered so close to another participant so that it feels as though the person is encroaching on personal space boundaries, etc.), and is otherwise easily visible (e.g., is not placed in front of bright or complex background, etc.).

In some embodiments, the device processors may be configured to replicate real-world scenarios, such as by anchoring the digital representation of virtual content to an empty chair at within a game scene, behind a physical or virtual console, etc. In an embodiment, the device processor may be configured to an select an empty chair (or position relative to a game table, equipment, etc.) that an individual (when the virtual content is an image of a remote participant) would likely have chosen if he/she was physically present in the environment (e.g., a chair that is not far away from the other participants in a game, an empty console in a control room, etc.).

In some embodiments, the device processors may be configured to detect changes in the numbers, locations, positions, sizes, etc. of the objects, virtual content, or people in the environment, determine whether the detected changes exceed a threshold value, and dynamically recompute the parameters or weights to account for the detected changes in response to determining that the detected changes exceed the threshold value. For example, a device process (e.g., a processor in a smartphone of a participant) may detect that a new participant (virtual, remote or co-located) has joined the game, meeting, training session, etc. after it has started, and recompute the parameters and/or weights to account for the new participant, and update the renderings of the virtual content (e.g., remote participants) based on the recomputed parameters and/or weights. As another example, the device process may detect that a participant (virtual, remote or co-located) has moved positions (e.g., moved laterally by changing seats, moved vertically by standing or sitting, etc.) after the game, meeting or training session has started, determine whether the distance between the participant's current and previous positions exceeds a threshold value, and recompute the parameters and/or update the renderings of the remote participants in response to determining that distance between the participant's current and previous positions exceeds a threshold value.

In some embodiments, the device processors may be configured to compute additional values and perform additional operations to account for special considerations associated with updating the renderings of the remote participants or re-positioning the placement of remote participants after the game, meeting or training session has started.

In some embodiments, the device processor may be configured to adjust the renderings of virtual content, such as images of remote participants (e.g., by re-sizing and re-spacing images of the virtual content) to support social conventions and facilitate human-to-human communications. For example, the device processor may be configured to determine the positioning of virtual content, such as images of virtual or remote participants, similar to how people typically join co-located games, meetings, training sessions, etc. In completely co-located games and meetings, it is typical for a latecomer to find a seat or a standing position that is near the rest of the group. It is also common for a latecomer to select a seat or standing position that is approximately equal distance from each of the other participants (for example, people generally won't sit right next to one another if there are other open seats more equally spaced). People do this naturally in part to improve eye contact with the greatest number of participants. A latecomer may also squeeze in to a group configuration, and the other participants may adjust their positions slightly to make space for the latecomer. To replicate these human behavior tendencies, the device processor may be configured to automatically adjust the positions/renderings of the other virtual content to maintain a good spacing and/or to account for the other considerations discussed above (e.g., line of sight, etc.).

In some embodiments, the device processor (e.g., a processor of a smartphone) may be configured to set the threshold values high enough so that the renderings are not adjusted when certain changes are detected, such as when a single participant stands up. The device processor may set the threshold values low enough so that the renderings are adjusted when other changes are detected, such as when a majority of co-located persons stand or sit.

In some embodiments, the device processor may be configured to communicate user changes to other device processors for consistent rendering. For example, if a user manually adjusts the location in which a digital representation of virtual content, such as a remote participant, is rendered on his or her smartphone, the device processor may send the adjusted location of the rendering to the other device processors, such as processors in smartphones of others engaged in the same game, meeting, training, etc. In response, the other device processors may also adjust the digital representation of the same virtual content so that the configuration of virtual content with respect to the environment remains consistent for all users.

FIG. 1A illustrates a user device in the form of a head mounted device 100 that may be configured to intelligently determine the display characteristics of a virtual object (e.g., digital representation of a remote participant) in accordance with the various embodiments. In the example illustrated in FIG. 1A, the head mounted device 100 includes a frame 102, two optical lenses 106, and a processor 114 that is communicatively coupled to an image projector 108, a monocular image sensor or cameras 110, a sensor array 112, a memory 116, and communication circuitry 118. The projector 108 may be embedded in arm portions 104 of the frame 102 and configured to project images onto the optical lenses 106. The projector 108 may include a light-emitting diode (LED) module, a light tunnel, a homogenizing lens, an optical display, a fold mirror, and other components well known in prior art projectors or head mounted displays. In some embodiments, the two optical lenses 106 may include image forming elements configured to superimpose an image on views through the lenses, in which case a projector 108 may not be implemented.

In some embodiments, the head mounted device 100 and/or the processor 114 may be configured to employ SLAM techniques to construct and update a map of an unknown environment while simultaneously keeping track of the head mounted device's 100 location within the environment. For example, a head mounted device 100 may be equipped with a monocular image sensor that captures images or frames from the environment. The head mounted device 100 may identify prominent objects (e.g., co-located participants) or features (e.g., facial and/or body features of co-located participants) within the captured image, estimate the dimensions and scale of the features in the image, compare the identified features to each other and/or to features in test images having known dimensions and scale, and identify correspondences based on the comparisons. Each correspondence may be a value set or an information structure that identifies a feature (or feature point) in one image as having a high probability of being the same feature in another image. Said another way, a correspondence may be a set of image points (e.g., a first point in a first image and a second point in a second image, etc.) that are in correspondence. The head mounted device 100 may produce a homography matrix information structure based on the identified correspondences, and use the homography matrix to determine its pose (e.g., position, orientation, etc.) within the environment.

Various embodiments may be implemented a smartphone, an example of which is illustrated in FIG. 1B. A smartphone 120 may include a processor 121 coupled to internal memory 122, a display 123, and to a speaker 124. Additionally, the smartphone 120 may include an antenna 125 for sending and receiving electromagnetic radiation that may be connected to a wireless data link and/or cellular telephone transceiver 126 coupled to the processor 121. Smartphones 120 typically also include menu selection buttons or rocker switches 127 for receiving user inputs.

A typical smartphone 120 also includes a sound encoding/decoding (CODEC) circuit 128, which digitizes sound received from a microphone into data packets suitable for wireless transmission and decodes received sound data packets to generate analog signals that are provided to the speaker to generate sound. Also, one or more of the processor 121, wireless transceiver 126 and CODEC 128 may include a digital signal processor (DSP) circuit (not shown separately).

Figure 1C:
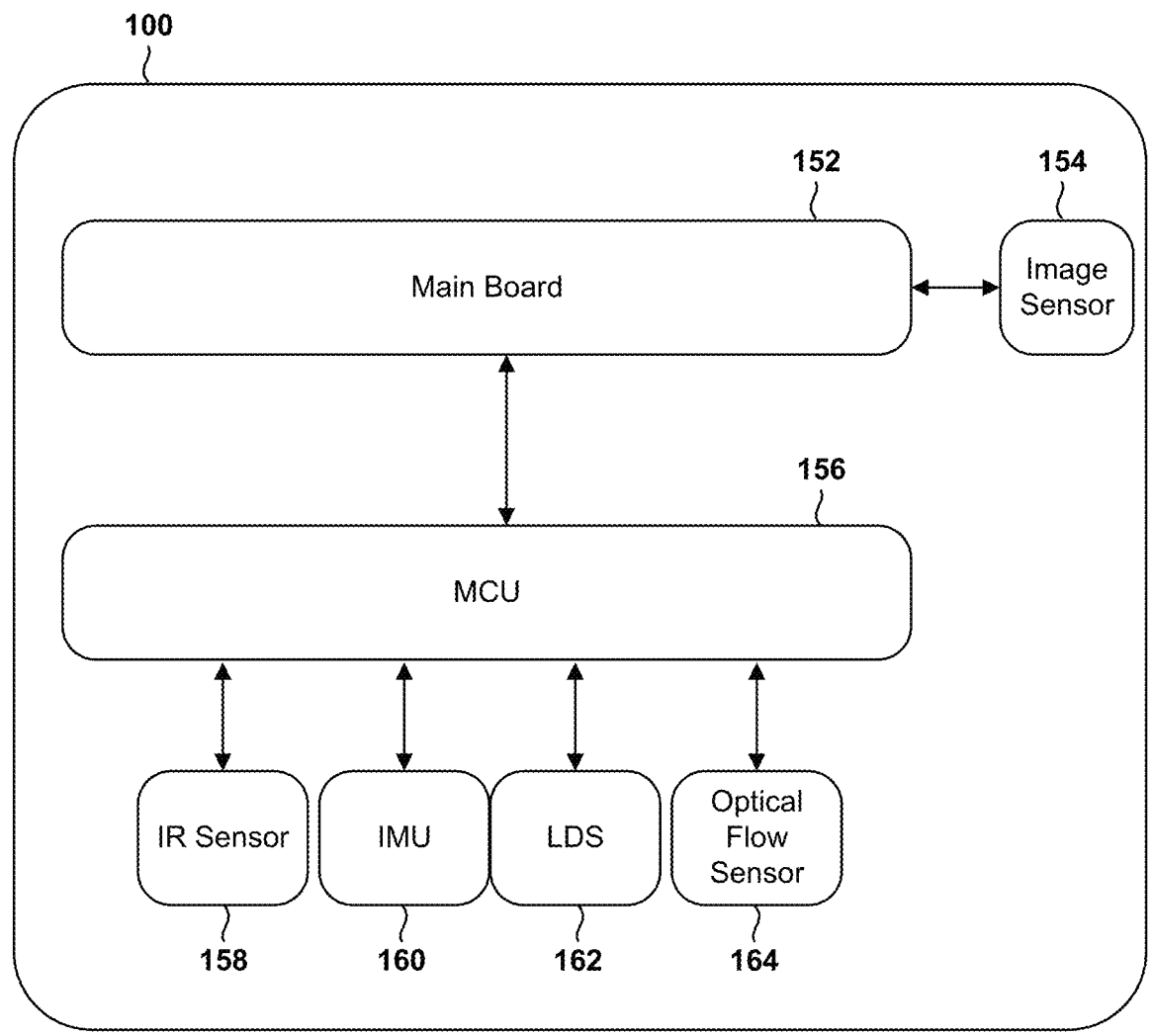
FIG. 1C is a system block diagram that illustrates the computer architecture and sensors that could be included in a device that is configured to render a digital representation of a remote participant in a virtual meeting in accordance with the embodiments.

FIG. 1C illustrates a computer architecture and various sensors that may be included in a head mounted device 100 or smartphone 120 that is configured to employ SLAM or other techniques to render a digital representation of a remote participant in a virtual meeting in accordance with the various embodiments. In the example illustrated in FIG. 1C, the head mounted device 100 includes a main board component 152, an image sensor 154, a microcontroller unit (MCU) 156, an infrared (IR) sensor 158, an inertial measurement unit (IMU) 160, a laser distance sensor (LDS) 162, and an optical flow sensor 164.

The sensors 154, 158-164 may gather information that is useful for employing SLAM techniques in a head mounted device 100 or smartphone 120. For example, the optical flow sensor 164 may measure optical flow or visual motion, and output measurements based on the optical flow/visual motion. An optical flow may identify or define the pattern of apparent motion of objects, surfaces, and edges in a visual scene caused by the relative motion between an observer (e.g., head mounted device 100, smartphone 120, wearer/user, etc.) and a scene. The optical flow information may be used by the MCU 156 to measure visual motion or relative motion between the head mounted device 100, smartphone 120 and other objects in the vicinity of the head mounted device 100, smartphone 120, etc. In addition, the head mounted device 100 or smartphone 120 may use the optical flow information for motion detection, object segmentation, time-to-contact information, focus of expansion calculations, motion compensated encoding, stereo disparity measurements, and other similar information. In some embodiments, the optical flow sensor 164 may be an image sensor that is coupled to the MCU 156 (or processor 114, 121) that is programmed to run an optical flow algorithm. In some embodiments, the optical flow sensor 164 may be vision chip that includes the image sensor and processor on the same chip or die.

The head mounted device 100 or smartphone 120 may be equipped with a variety of additional sensors, including a gyroscope, accelerometers, a magnetometer, a magnetic compass, an altimeter, a camera, an optical reader, an orientation sensor, a monocular image sensor, and/or similar sensors for monitoring physical conditions (e.g., location, motion, acceleration, orientation, altitude, etc.) or gathering information that is useful for employing SLAM techniques.

In the following descriptions of various embodiments, the figures and the descriptions of the figures refer to an example implementation of various embodiments in which local and remote participants are meeting around a game table, such as a table on which a real and virtual gameboard is presented in an augmented reality game. This example is for illustration purposes and is not intended to be limiting. Various embodiments are equally applicable to other applications in which virtual reality is used to enable local and remote participants, as well as virtual content, to interact as if physically located in the same environment, such as games involving a common game environment (e.g., gameboard, game scene, etc.), a conference table for a meeting, an equipment control panel for training sessions involving equipment, which may be physically present or rendered virtually, training sessions among teams of decision makers, meetings in control rooms or war rooms, etc.

Figure 2A:
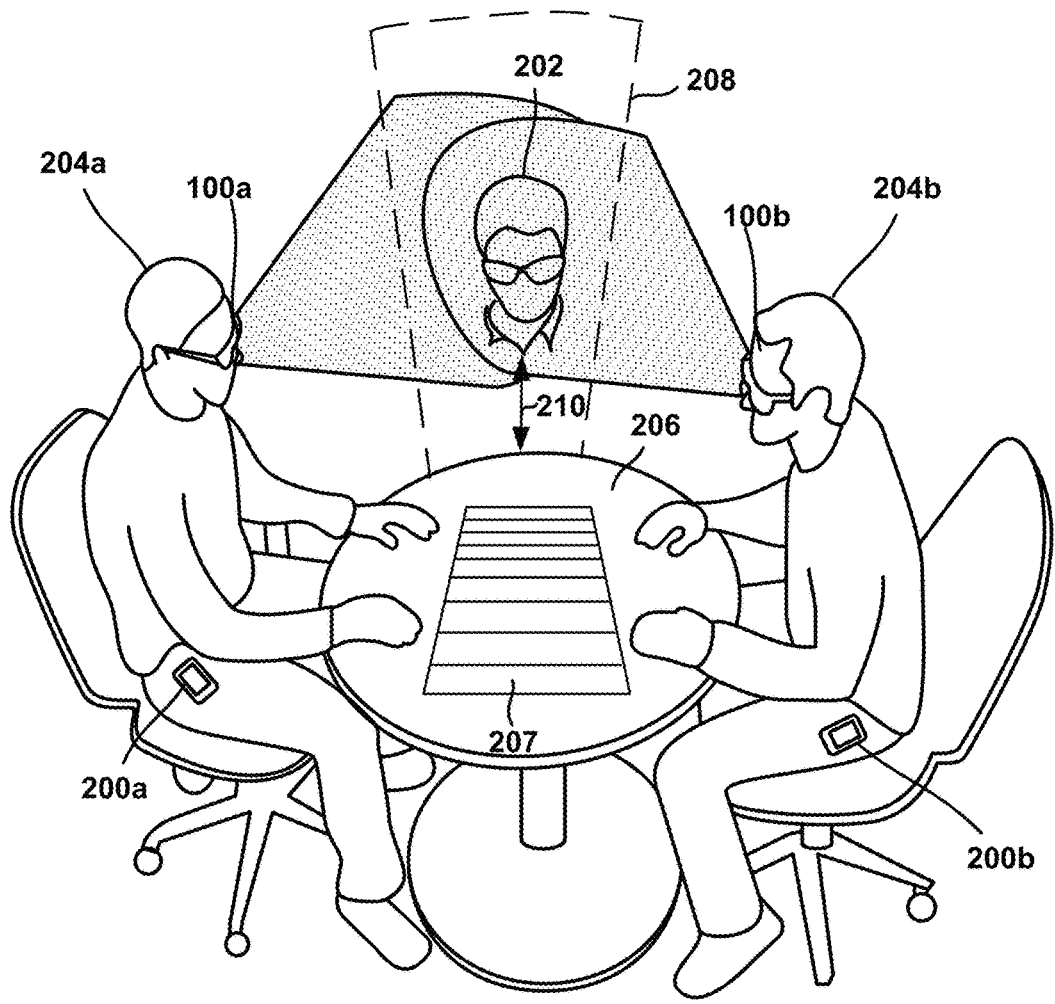
FIG. 2A is an illustration of meeting participants wearing devices that could configured to render a digital representation of a remote participant in a virtual meeting in accordance with the embodiments.

FIG. 2A illustrates that head mounted devices 100a, 100b configured in accordance with the various embodiments may be used to conduct a game with virtual content, such as a remote participant 202. A device processor (e.g., a processor 121 in a participant's smartphone 200a, a processor 114 in a head mounted device 100a, etc.) may be configured to collaborate with other device processors (e.g., a processor 121 in a participant's smartphone 200b, processor 114 in a head mounted device 100b) to intelligently determine the display properties of a digital representation of virtual content, such as a remote participant 202. For example, the device processor may be configured to capture an image of an environment (e.g., game room) via a camera of a smartphone or head mounted device, analyze the captured image to identify people and objects (e.g., game table 206, a gameboard 207, co-located participants 204a and 204b, etc.) within the environment, capture or compute data (e.g., via cameras and other sensors of a smartphone 200a, via a sensor array 112 or processor 114 of the head mounted device 100a, etc.), compute various parameters for each of the identified objects based on the captured/computed data, and send the computed/determined parameters to the other device processors (e.g., a processor 121 within another smartphone 200b). The device processors may use the parameters to determine various display properties and render the digital representation of virtual content, such as a remote participant 202, so that the virtual content is placed at a game table 206 and appears to each co-located participant 204a, 204b to be in within a fixed area 208, such as with respect to a real or virtual gameboard 207.

FIG. 2A also illustrates that the smartphones 200a, 200b and/or head mounted devices 100a, 100b may be configured to size the digital representation of virtual content, such as a remote participant 202, so that the remote participant does not appear too big, too small, or otherwise unnatural to the co-located participants 204a, 204b. The smartphones 200a, 200b and/or head mounted devices 100a, 100b may also render the digital representation of virtual content, such as a remote participant 202, so that the virtual content appears to be placed at a proper height 210 relative to the co-located participants 204a, 204b, is appropriately spaced (e.g., all participants appear approximately equidistant, etc.), accounts for inter-person distance (e.g., is not rendered so close to another participant so that it feels as though the person is encroaching on personal space boundaries, etc.), and is otherwise easily visible (e.g., is not placed in front of bright or complex background, etc.).

Figure 2B:
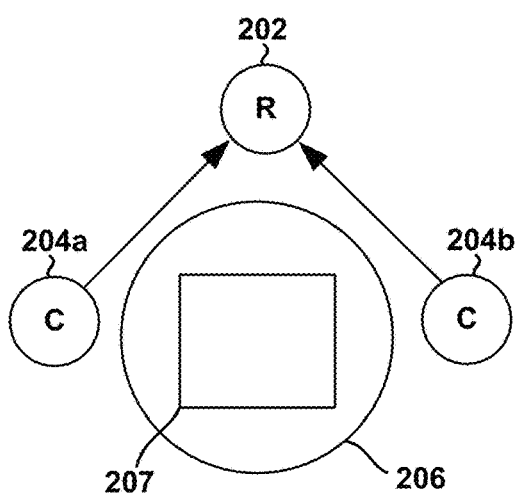
FIG. 2B is a block diagram illustrating that the digital representation of the remote participant may be rendered so that the remote participant is within the field-of-view of the co-located participants and does not block the line-of-sight of any of the remote or co-located participants.

FIG. 2B illustrates that the digital representation of virtual content, such as a remote participant 202, may be rendered so that the virtual content is within the field-of-view of the co-located participants 204a, 204b viewed through their smartphone display or head mounted devices and does not to block the line-of-sight of any of remote or co-located participants.

Figure 3A:
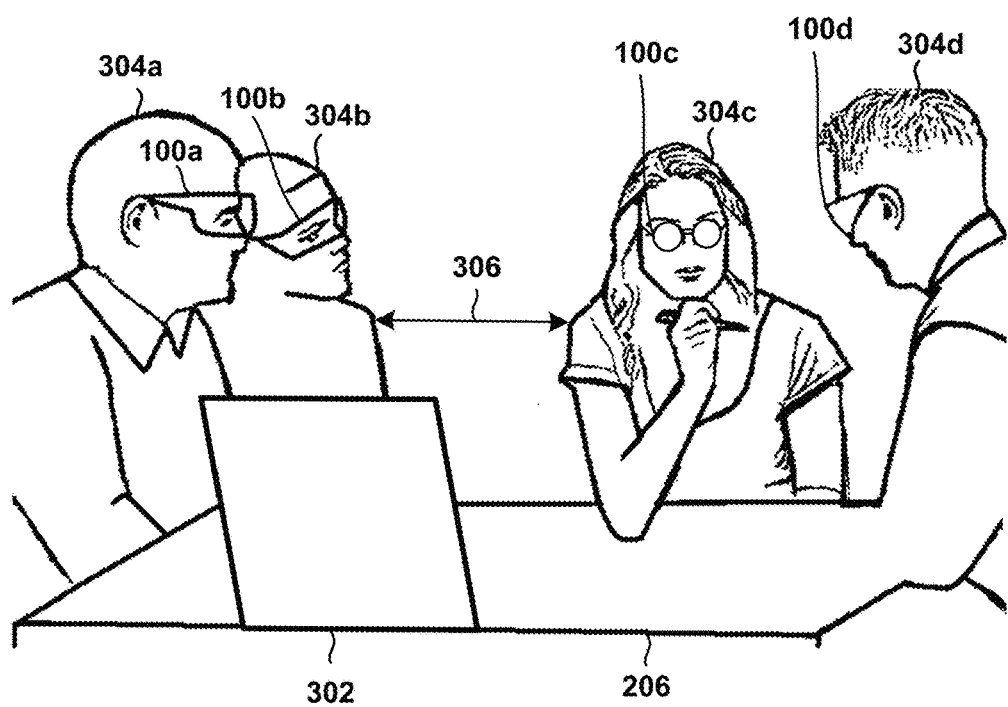
FIGS. 3A and 3B are block diagrams illustrating devices configured to render a digital representation of a remote participant in a virtual meeting that includes multiple co-located participants that are physically present in the same environment and sitting around a game table in positions suitable for viewing a presentation.
Figure 3B:
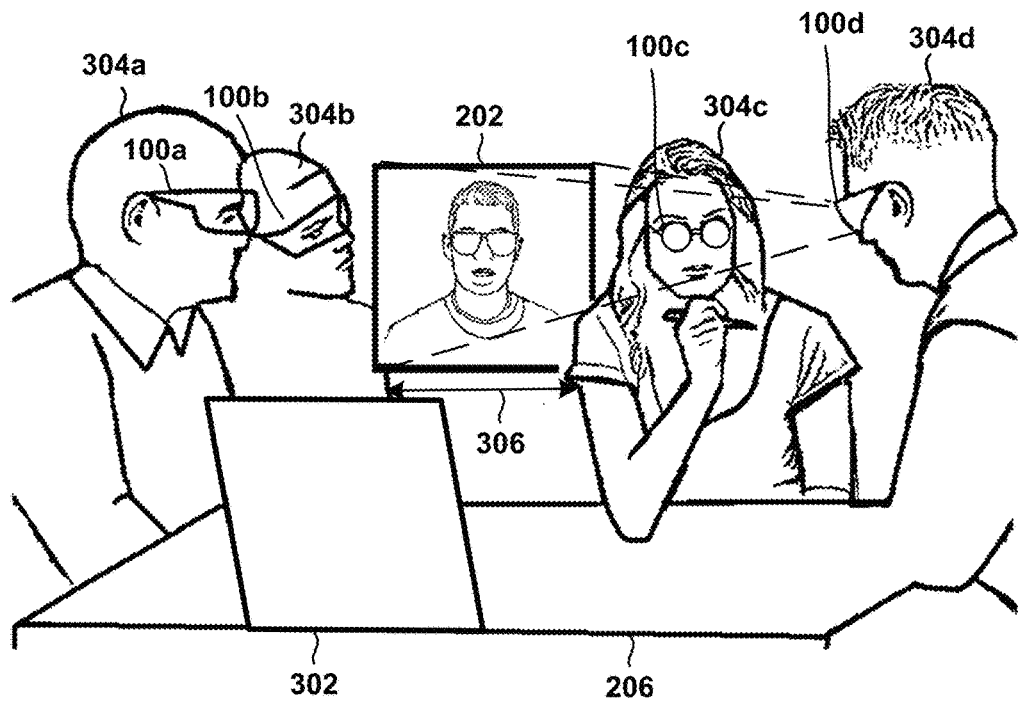

FIGS. 3A and 3B illustrate multiple meeting participants that are co-located in the same environment (e.g., game room), sitting around a game table 206, and wearing head mounted devices 100a-100d.

With reference to FIG. 3A, the co-located participants 304a-304d have selected their seats and/or have arranged themselves around three sides of the game table 206 so that they can communicate with one another and view a gameboard, whiteboard, TV, monitor, or presentation 302. Each of the co-located participants 304a-304d is in a slightly different physical location relative to the environment and game table 206, and there is a person-sized gap 306 between two co-located participant 304b and co-located participant 304c.

With reference to FIG. 3B, the smartphones 200a, 200b and/or head mounted devices 100a-100d may be configured to communicate with one another to collaboratively determine that the digital representation of virtual content, such as a remote participant 202, should be rendered in the person-sized gap 306. As part of these operations, the smartphones 200a, 200b and/or head mounted devices 100a-100d may analyze, compute, or account for various parameters (and their respective weights), including a fixed position parameter, a size parameter, a line-of-sight parameter, a field-of-view parameter, a spacing parameter, inter-person distance parameter, a height parameter, and a visibility parameter.

The fixed position parameter may indicate that the digital representation of virtual content, such as a remote participant 202, should be placed in a fixed position that is the same with respect to all the co-located participants 304a-304d. For example, if the digital representation of virtual content, such as a remote participant 202, is placed in front of a certain position at the game table 206, all co-located participants may see the virtual content in that same position or within a fixed area. A weight value associated with the fixed position parameter may indicate the weight or importance of the rendering of the digital representation of the virtual content in a fixed position relative to the other parameters.

The size parameter(s) may indicate that the rendered size of the digital representation of virtual content, such as a remote participant 202, should be consistent for all co-located participants 304a-304d, and should be appropriate (e.g., a natural and expected size) for the position in which it is rendered. For example, the size parameter may indicate that virtual content that is a remote participant's body should be rendered to approximately the same size as the bodies of the co-located participants 304a-304d. To accomplish this, one or more of the smartphones 200a, 200b and/or head mounted displays 100a-100d may be configured to measure the sizes of the heads of the co-located participants 304a-304d and/or the distances between them, generate averages, and use this information to determine the render size in which the digital representation of virtual content, such as a remote participant 202. A weight value associated with each size parameter may indicate the weight or importance of the rendering the digital representation of virtual content, such as a remote participant 202, consistent for all co-located participants and/or approximately the same size as the co-located participants 304a-304d.

The line-of-sight parameter(s) may indicate that the digital representation of virtual content, such as a remote participant 202, should not be rendered in a position that blocks the line-of-sight of any of the co-located participants 304a-304d, which may be determined by the smartphones 200a, 200b and/or head mounted devices 100a-100d identifying the regions that block some or all of the view of another participant. In some embodiments, one or more of the smartphones 200a, 200b and/or head mounted devices 100a-100d may be configured to measure the regions and/or lines-of-sight broadly so that the digital representation of virtual content, such as a remote participant 202, is not placed too close to an adjacent participant (e.g., co-located participant 304b or co-located participant 304c). A weight value associated with each line-of-sight parameter may indicate the weight or importance of the rendering the digital representation of virtual content, such as a remote participant 202, to not block the line-of-sight of any of the co-located participants 304a-304d.

The field-of-view parameter(s) may indicate that the digital representation of virtual content, such as a remote participant 202. should be rendered in a way that fits into the field-of-view of as many co-located participants 304a-304d as possible. A weight value associated with each field-of-view parameter may indicate the weight or importance of the rendering of the digital representation of virtual content, such as a remote participant 202, to fit into the field-of-view of another co-located participant 304a-304d. Because smartphones 200a, 200b and/or head mounted displays 100a-d may have a narrow field-of-view, it may be difficult to render the virtual content, such as a remote person, within the field-of-view of all co-located participants 304a-304d. In this case, the weighting of one or more of the field-of-view parameter(s) may be reduced to account for the characteristics of the individual smartphones 200a, 200b and/or head mounted devices 100a-100d and/or any difficulties associated with render the digital representation of the virtual content, such as a remote participant 202, within the field-of-view of all co-located participants 304a-304d.

The spacing parameter(s) may indicate that the digital representation of virtual content, such as a remote participant 202, should be placed equidistance from the co-located participants 304a-304d, similar to how people would normally organize themselves in a face-to-face game setting. For example, a person would typically not sit too close to another person and would not sit too far away from the rest of the group. To account for this, the smartphones 200a, 200b and/or head mounted displays 100a-100d may measure the distances between each of the other participants, account for obstacles and objects (e.g., presentation 302) in the environment, and render the digital representation of the remote participant 202 on an acceptable side (e.g., side that does not include the presentation 302) that has the most space available. The smartphones 200a, 200b and/or head mounted displays 100a-100d may take measurements, compute an average score, use the average score to determine the longest side, and place the digital representation of the remote participant 202 on the longest side. This process may be repeated for subsequent remote participants, factoring in the previously positioned virtual content, such as remote participants. Weight values associated with each spacing parameter may indicate the weight or importance of the rendering the digital representation of virtual content, such as a remote participant 202, equidistance from the co-located participants 304a-304d.

The inter-person distance parameter(s) may indicate that the digital representation of virtual content, such as a remote participant 202, should not be rendered so close to another participant (e.g., the co-located participant 304b) so that it feels as though the remote participant is encroaching on personal space boundaries. Since this inter-person distance may vary from culture to culture, the smartphones 200a, 200b and/or head mounted displays 100a-d may be configured to determine the distance based on preconfigured values, the behaviors and distances between the co-located participants, artificial intelligence, or other similar parameters. A weight value associated with the inter-person distance parameter may indicate the weight or importance of the rendering the digital representation of virtual content, such as a remote participant 202, so that the remote participant does not appear to encroach upon the personal space boundaries of the co-located participants 304a-304d.

The height parameter(s) may indicate that the digital representation of virtual content, such as a remote participant 202. should be placed at the proper height, given the locations, positions and heights of the co-located participants 304a-304d. This may entail sitting or standing height, depending on the locations, positions and heights of the co-located participants 304a-304d. In some embodiments, the smartphones 200a, 200b and/or head mounted devices 100a-d may be configured to determine height as the average head or eye height of each co-located participant. In some embodiments, the smartphones 200a, 200b and/or head mounted devices 100a-d may be configured to determine whether the majority of co-located participants 304a-304d are sitting or standing and take the average of whichever is the majority. For example, if three co-located participants are sitting and two co-located participants are standing, the smartphones 200a, 200b and/or head mounted devices 100a-d may take the average eye height of the three seated participants and place the digital representation of virtual content, such as a remote participant 202, at that level. A weight value associated with each height parameter may indicate the weight or importance of the rendering the digital representation of virtual content, such as a remote participant 202, the proper height relative to the other parameters.

The visibility parameter(s) may indicate that the digital representation of virtual content, such as a remote participant 202, should be placed to optimize for visibility, such as by avoiding bright or complex backgrounds or anchor objects that could hinder the visibility of the digital representation of virtual content, such as a remote participant 202, or interfere with the view of the co-located participants 304a-304d. A weight value associated with each visibility parameter may indicate the weight or importance of the rendering the digital representation to optimize for visibility.

Returning to the example illustrated in FIG. 3B, the smartphones 200a, 200b and/or head mounted devices 100a-d may determine that digital representation of virtual content, such as a remote participant 202, should be rendered in the person-sized gap 306 by capturing and analyzing images of the environment to identify people and objects in the environment, including the game participants, the game table 206, and/or the presentation 302. The head mounted devices 100a-d may compute various parameters (e.g., depth, distance, orientation, etc.) for the identified objects/people in the environment. The smartphones 200a, 200b and/or head mounted devices 100a-100d may use the computed/analyzed parameters to determine that the digital representation of the remote participant 202 should be rendered in the person-sized gap 306. That is, the smartphones 200a, 200b and/or head mounted devices 100a-100d may determine, based on the analysis of one or more of the above-parameters and their respective weights, that positioning the digital representation of virtual content, such as a remote participant 202, in the person-sized gap 306 will allow the co-located participants 304a-304d to continue to view the presentation 302 and communicate with one another.

In response to determining that the digital representation of virtual content, such as a remote participant 202, should be rendered in the person-sized gap 306, the smartphones 200a, 200b and/or head mounted devices 100a-100d may search the captured images of the environment to identify a surface or object (e.g., empty chair) that is inside or in close proximity to the person-sized gap 306, select an identified surface/object for use as an anchor, and determine display properties (e.g., size, etc.) for the digital representation of virtual content, such as a remote participant 202, based on computed/analyzed parameters and relative distances between the selected surface/object and the co-located participants 304a-304d. The smartphones 200a, 200b and/or head mounted devices 100a-100d may render the digital representation of virtual content, such as a remote participant 202, so that the virtual content appears in a fixed position (e.g., anchored to the anchor surface/object) to all co-located participants and/or so that the co-located participants can readily and naturally communicate and interact with each other and the virtual content.

Figure 4A:
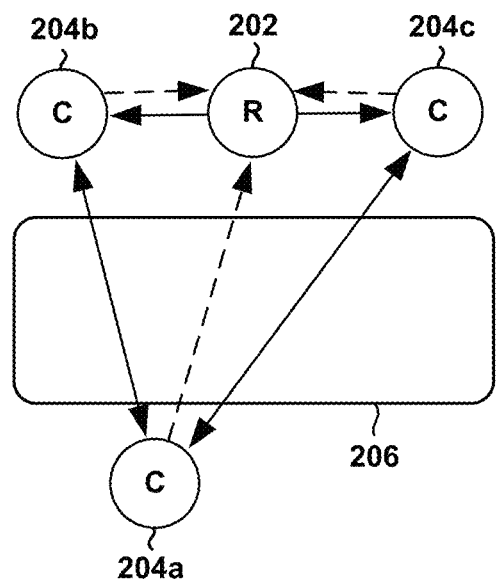
FIG. 4A is a block diagram illustrating that a device may render a digital representation of the remote meeting participant at a natural position relative to the game table and so that each of the co-located participants have a direct line-of-sight to the digital representation of the remote meeting participant.

FIG. 4A illustrates an example in which the digital representation of virtual content, such as a remote participant 202, is placed at a natural position relative to the game table 206, and each of the co-located participants 204a-204c have a direct line-of-sight (indicated by the dashed arrows) to the digital representation of the virtual content. However, the location/position of the digital representation of virtual content, such as a remote participant 202, blocks the line-of-sight of co-located participants 204b and 204c. This could occur if, for example, co-located participant 204c joins the game after the game is underway.

Figure 4B:
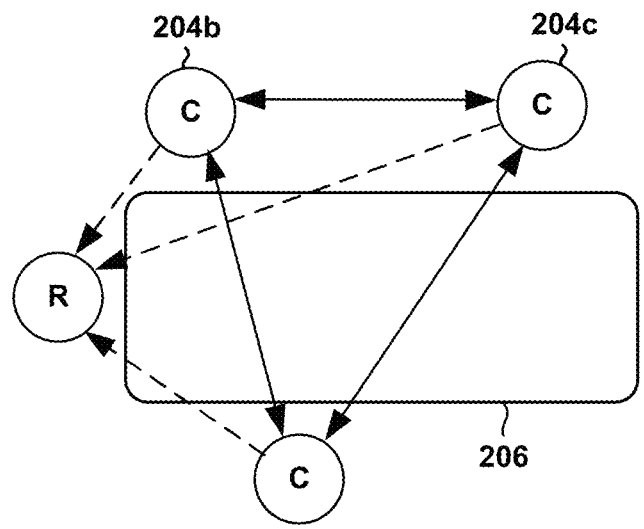
FIG. 4B is a block diagram illustrating that a device configured in accordance with the embodiments may exchange data with other devices present in the environment to relocate the digital representation of the remote meeting participant to a different location or position relative to the game table so that all of the co-located participants have a direct line-of-sight to each other and to the digital representation of the remote meeting participant.

FIG. 4B illustrates that the participant smartphones and/or head mounted devices configured in accordance with the embodiment may collaborate to determine that the line-of-sight between co-located participants 204b and 204c is blocked, and relocate the digital representation of virtual content, such as a remote participant 202, to a different location or position relative to the game table 206 so that all of the co-located participants 204a-204c have a direct line-of-sight to each other (indicated by the solid arrows) and a direct line-of-sight to the digital representation of virtual content, such as a remote participant 202 (indicated by the dashed arrows).

Figure 5A:
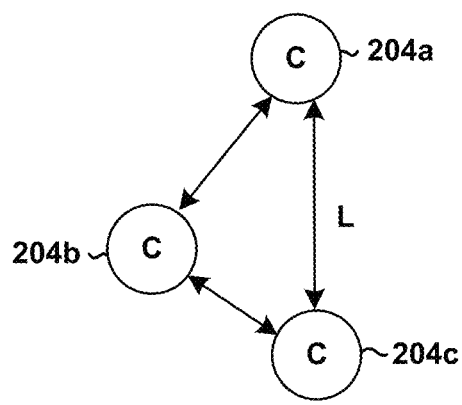
FIGS. 5A-5C are block diagrams illustrating that devices configured in accordance with the embodiments may intelligently determine the locations in which the digital representations of the remote meeting participants should be rendered relative to the locations or positions of the co-located participants that are physically present in the environment.
Figure 5B:
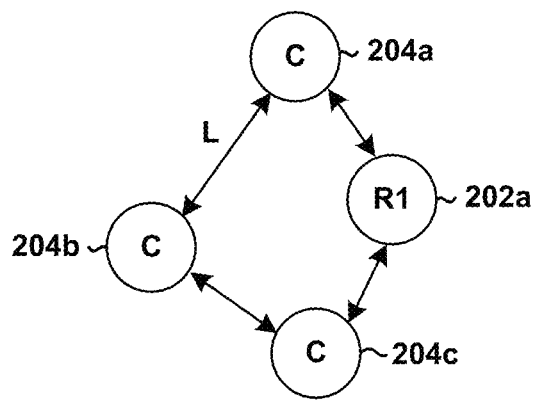
Figure 5C:
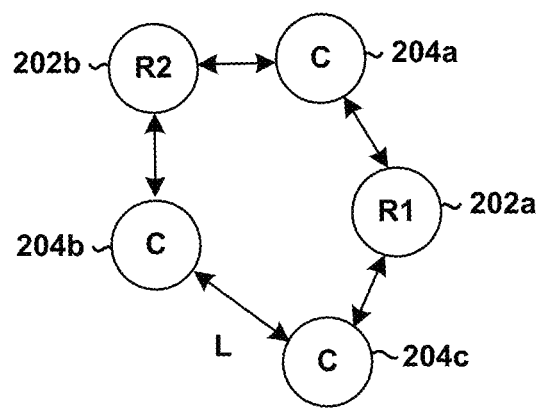

FIGS. 5A-5C illustrate that participant smartphones and/or head mounted devices configured in accordance with the embodiments may intelligently determine the locations in which the digital representations of virtual content, such as remote participants 202a, 202b, should be rendered relative to the locations or positions of the co-located participants 204a-204c. FIG. 5A illustrates that the participant smartphones and/or head mounted devices may be configured to compute the distances between the co-located participants 204a-204c, and determine that the largest distance (L) between participants is between co-located participant 204a and co-located participant 204c.

With reference FIG. 5B, the participant smartphones and/or head mounted devices may render the digital representation of virtual content, such as a first remote participant 202a, in-between co-located participant 204a and co-located participant 204c. The smartphones and/or head mounted devices may recompute the distances between the co-located participants 204a-204c and the digital representation of virtual content, such as a remote participant 202a, and determine that the largest distance (L) between participants is now between co-located participant 204a and co-located participant 204b.

FIG. 5C illustrates that the participant smartphones and/or head mounted devices may render the digital representation of virtual content, such as a second remote participant 202b, in-between co-located participant 204a and co-located participant 204b. The participant smartphones and/or head mounted device may recompute the distances between the co-located participants 204a-204c and the digital representations of virtual content, such as remote participants 202a, 202b, and determine that the largest distance (L) between participants is now between co-located participant 204b and co-located participant 204c. The smartphones and/or head mounted devices may repeat these operations until all of the remote participants are rendered in the environment.

FIGS. 6-9 illustrate methods 600, 700, 800, 900 of determining display properties for a digital representation of virtual content, such as a remote participant, in accordance with various embodiments (e.g., including any or all of the embodiments discussed above with reference to FIGS. 1-5). All or portions of the methods 600, 700, 800, 900 may be performed by a device processor, such as a processor (e.g., processor 114 illustrated in FIG. 1A) in a head mounted device worn by a co-located participant, a processor (e.g., processor 121 illustrated in FIG. 1B) in a smartphone, either independently or commutatively coupled to a head mounted device worn by a co-located participant, a processor in a server computing device commutatively coupled to the smartphone or head mounted device, or a processor associated a cloud network or a cloud-based computing system.

Figure 6:
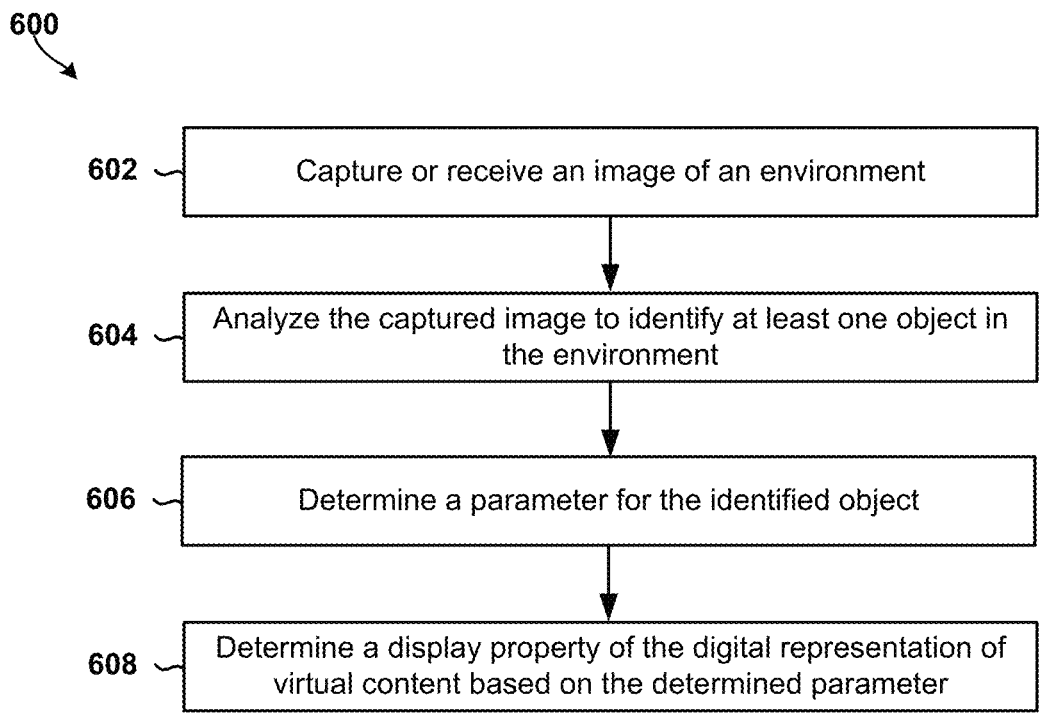
FIGS. 6-9 are process flow diagrams illustrating methods of determining display properties for a digital representation of a remote participant in accordance with some embodiments.

Referring to FIG. 6, in block 602 of method 600, the device processor may capture, generate or receive an image of an environment. For example, a camera on a smartphone or head mounted device may capture video of the environment and provide image frames to the device processor. As another example, images from the environment may be captured by one or more cameras positioned within the environment and in communication with the device processor.

In block 604, the device processor may analyze the captured image to identify at least one object (e.g., a person, a game table, an empty seat, etc.) in the environment. In some embodiments, as part of the operations in block 604, the device processor may to use localization and mapping techniques, such as machine vision, VSLAM, or other technologies and techniques known in the art, to create a grid or map of the environment, identify the object, determine the object's location, orientation and/or position in the environment, and/or to perform other similar operations.

In block 606, the device processor may determine a parameter for the identified object. For example, the device process may determine any or all of a fixed position parameter, a size parameter, a line-of-sight parameter, a field-of-view parameter, a spacing parameter, an inter-person distance parameter, a height parameter, and/or a visibility parameter in block 606. In some embodiments, each of the determined parameters may be associated with one or more weights or priorities that indicate the respective importance.

In some embodiments, the device processor may be configured to adjust the priorities or weights associated with the parameters based on user inputs and/or to account for various conditions, events or preferences. For example, the device processor may determine that rending a digital representation of virtual content, such as a remote participant, in different positions for different co-located participants is more distracting or disruptive to human-to-human communications and interactions than rendering a digital representation of virtual content, such as a remote participant, much smaller than the sizes of the co-located participants that are physically present in the environment. As such, to accommodate a game or meeting with many remote participants, the device processor may increase the weights associated with the fixed position parameter or decrease the weights associated with the size parameter. As another example, the device processor may determine that rending a digital representation of virtual content, such as a remote participant, in different positions for different co-located participants is more distracting or disruptive to human-to-human communications and interactions than rendering a digital representation of virtual content, such as a remote participant, too close to the co-located participants physically present in the environment. In response, the device processor may assign a higher priority or weight to the fixed position parameter than the priority/weight assigned to the inter-person distance parameter.

In some embodiments, the device processor may be configured to adjust the priorities or weights associated with the parameters based on user inputs. In such embodiments, the device processor may allow the user/wearer to manually control the degree to which various parameters are important to that user or to a group or users (e.g., game participants, etc.). In some embodiments, the device processor may receive user inputs in the form of user selections made in a settings menu of a user interface of a smartphone, head mounted display and/or an associated computing device.

In some embodiments, the device processor may assign a higher priority or weight to the fixed position parameter, the size parameter, or the line-of-sight parameter than the priorities/weights assigned to the field-of-view parameter, the spacing parameter, the inter-person distance parameter, the height parameter, and the visibility parameter.

Returning to FIG. 6, the device processor may determine a display property of the digital representation of virtual content, such as a remote participant, based on the determined parameters (and their respective weights/priorities) in block 608. For example, the device process may determine, based on the parameters determined in block 608, that the digital representation of virtual content, such as a remote participant, should be rendered in an area encompassed by an empty space (e.g., empty chair, etc.) present in the environment. As another example, the device process may determine, based on the parameters determined in block 608, that the digital representation of the virtual content, such as a remote participant, should be sized so that the virtual content appears to the user/wearer to be approximately 6 feet tall, with a head size of between 6 to 7 inches wide and 8 to 9 inches long, a chest circumference between 44 and 46 inches, and a shoulder width of 16 inches.

Figure 7:
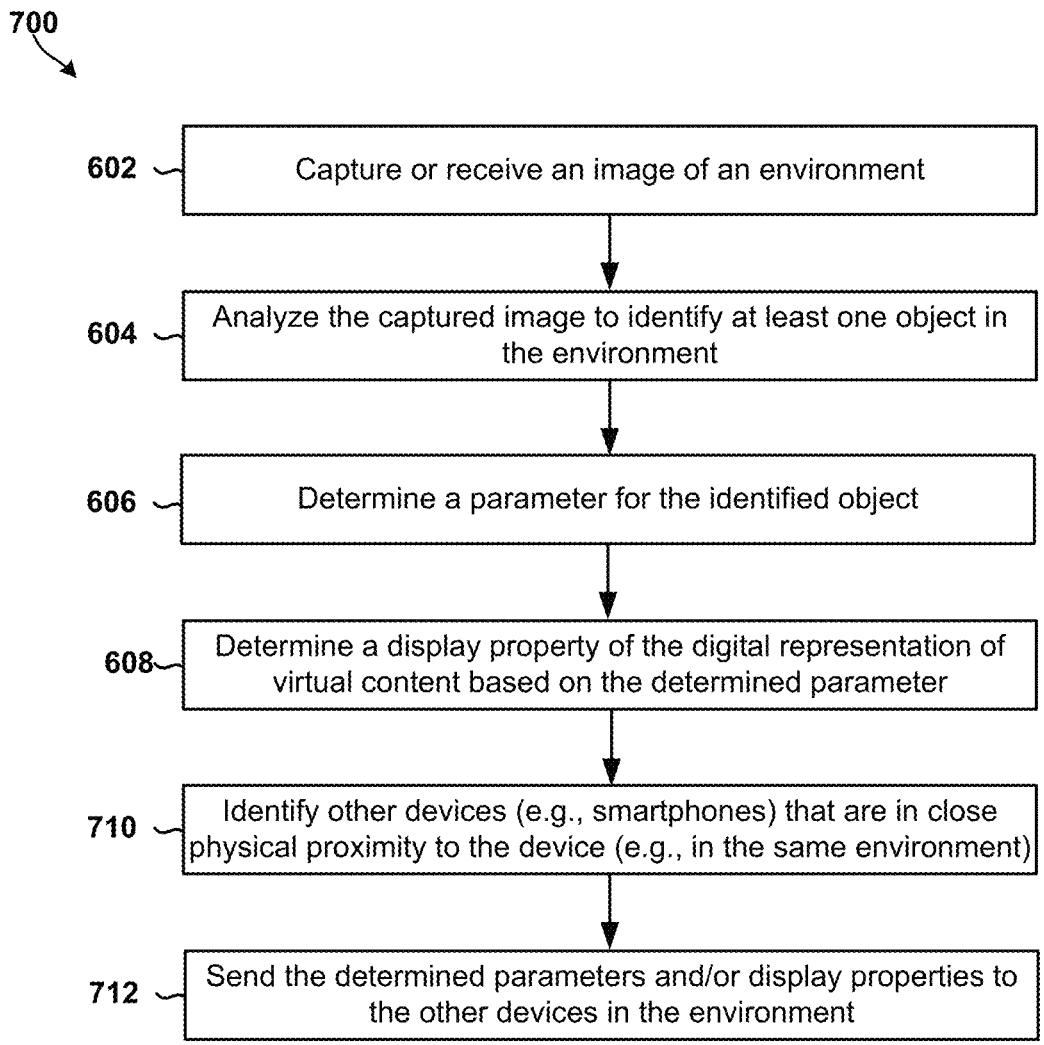

Referring to FIG. 7, in blocks 602-608 of the method 700 the device processor may perform operations of the like numbered blocks of the method 600 as described with reference to FIG. 6.

in block 710, the device processor may identify other devices (e.g., other smartphones, a computing device, mobile device, head mounted device, etc.) that are in close physical proximity (e.g., in the same environment, area, game room, etc.) to the device processor. This may be accomplished by, for example, broadcasting a ping message or transmitting a beacon requesting that all devices that receive the message/beacon respond with an identifier (e.g., a media access control (MAC) address, etc.), communication parameters, location information, and/or other similar information.

In block 712, the device processor may send the parameters determined in block 606 and/or the display properties determined in block 608 to the identified devices (i.e., the other devices in the same environment, etc.).

Figure 8:
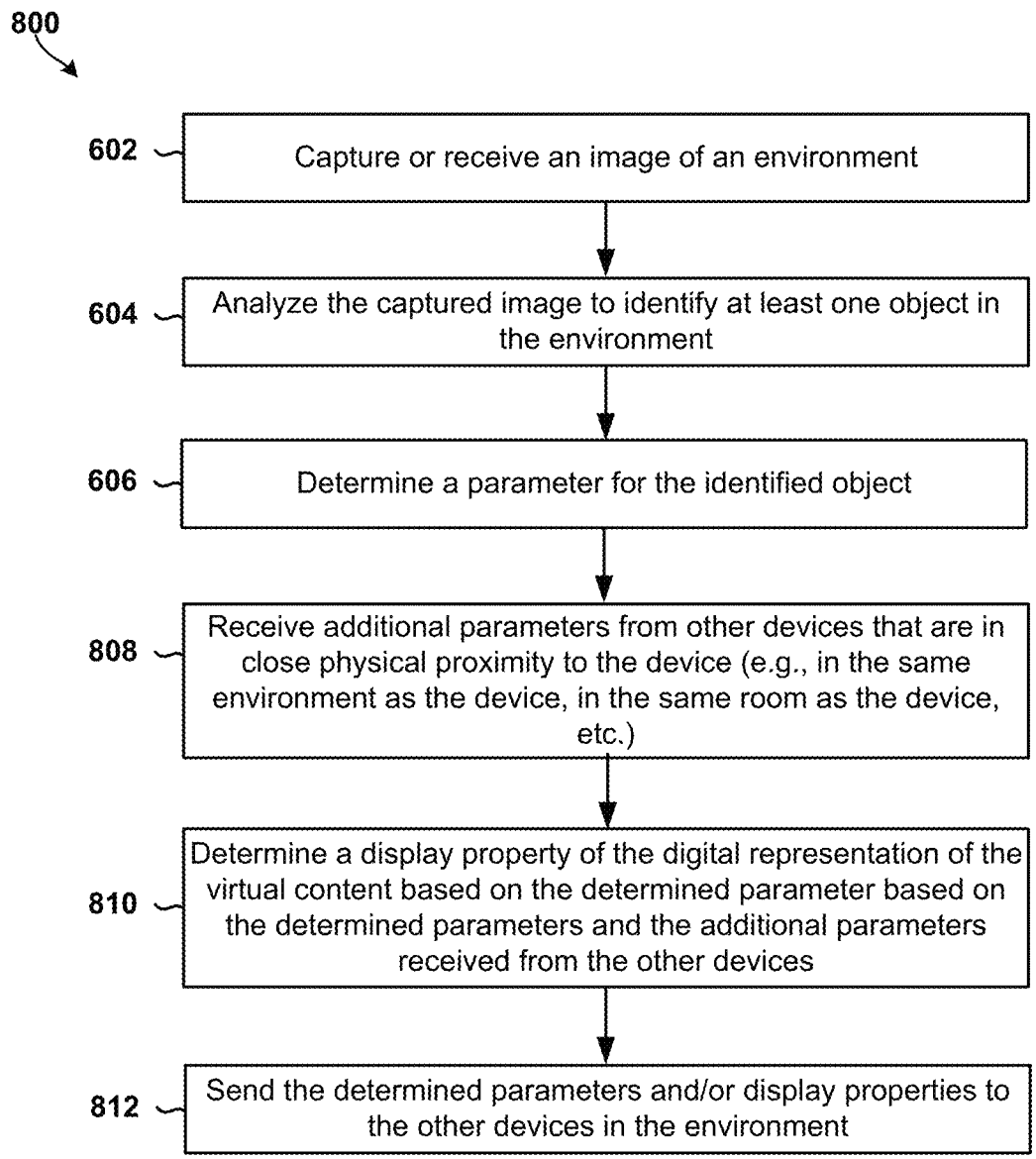

Referring to FIG. 8, in blocks 602-606 of the method 800 the device processor may perform operations of the like numbered blocks of the method 600 as described with reference to FIG. 6.

In block 808, the device processor may receive additional parameters from one or more other devices that are in close physical proximity (e.g., in the same environment) to the device processor. For example, as each device processor determines parameters, such parameters may be transmitted to all other device processors within the environment. As another example, if a single device processor is performing operations of various embodiments for all devices in the environment, each smartphone or head mounted device may send images, location, orientation, and other information to that one processing device.

In block 810, the device processor may determine the display properties for the digital representation of virtual content, such as a remote participant, based on the determined parameters and the additional parameters received from the other devices.

In block 812, the device processor may send the display properties determined in block 810 to the identified devices (i.e., the other devices in the same environment, etc.).

Figure 9:
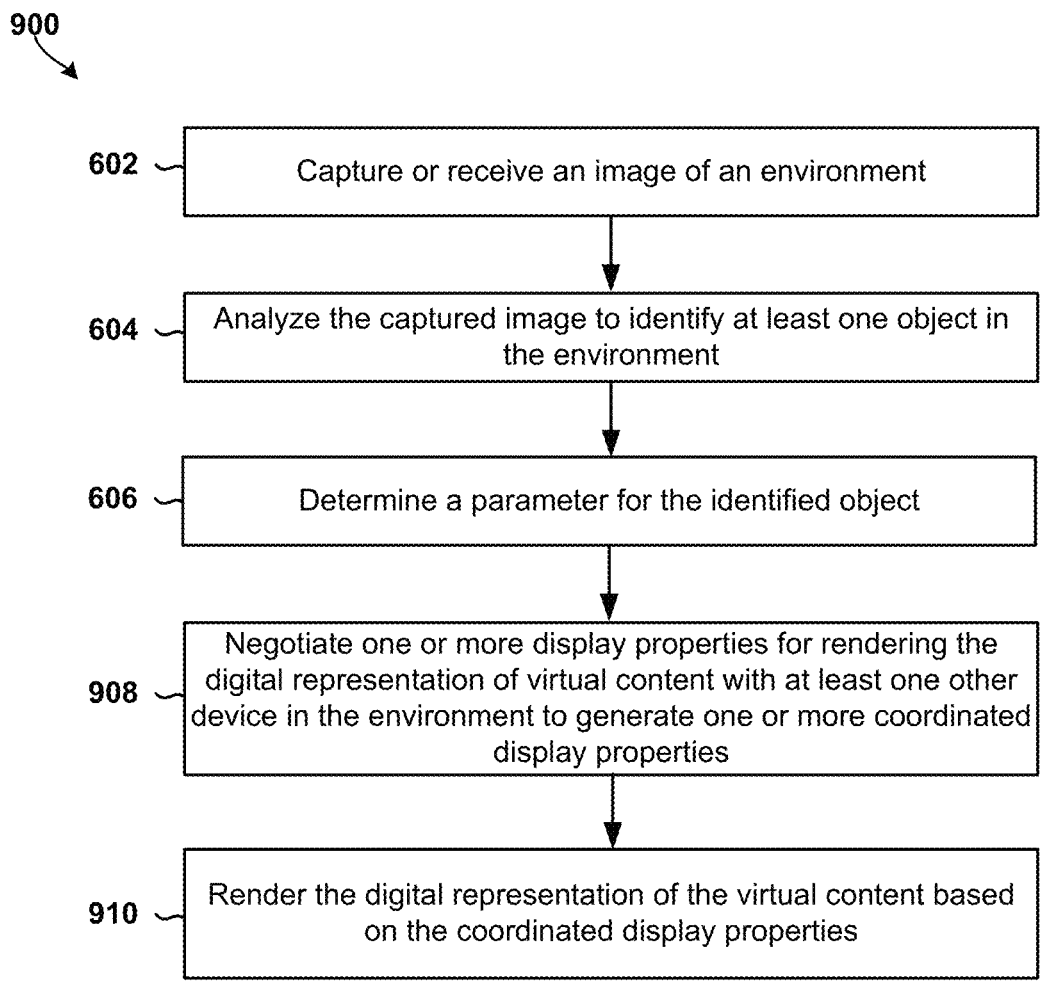

Referring to FIG. 9, in blocks 602-606 of the method 900 the device processor may perform operations of the like numbered blocks of the method 600 as described with reference to FIG. 6.

In block 908, the device processor may negotiate display properties for rendering the digital representation of virtual content, such as a remote participant, with other devices in the environment (or in close physical proximity to the participants smartphones, head mounted device, etc.) to generate coordinated display properties. For example, the device processor may send proposed display properties to the other devices and receive from each device their own proposed display properties. Various decision methods may be employed by one, some or all device processors among the devices to arrive at a single set of display properties. For example, each device processor may test each received set of display properties and send to the other devices an indication of whether any of the various criteria for determining display properties is violated. As another example, one device processor within the environment may be designated as the controller for determining display properties, and may do so based on inputs (e.g., position and orientation information and images capture by other head mounted displays) and use the collected information to determine the coordinated display properties. Other methods may be used in determining coordinated display properties.

In block 910, the device processor may render the digital representation of virtual content, such as a remote participant, based on the coordinated display properties. For example, the device processor may use the coordinated display properties to render the digital representation of the virtual content, such as a remote participant, in a fixed position that is the same with respect to all the co-located participants. That is, because the display properties are negotiated and coordinated, if the digital representation of virtual content, such as a remote participant, is placed in a certain position at a game table in another smartphone or head mounted device in the environment, the device processor will render the digital representation of virtual content, such as a remote participant, in that same position.

Figure 10:
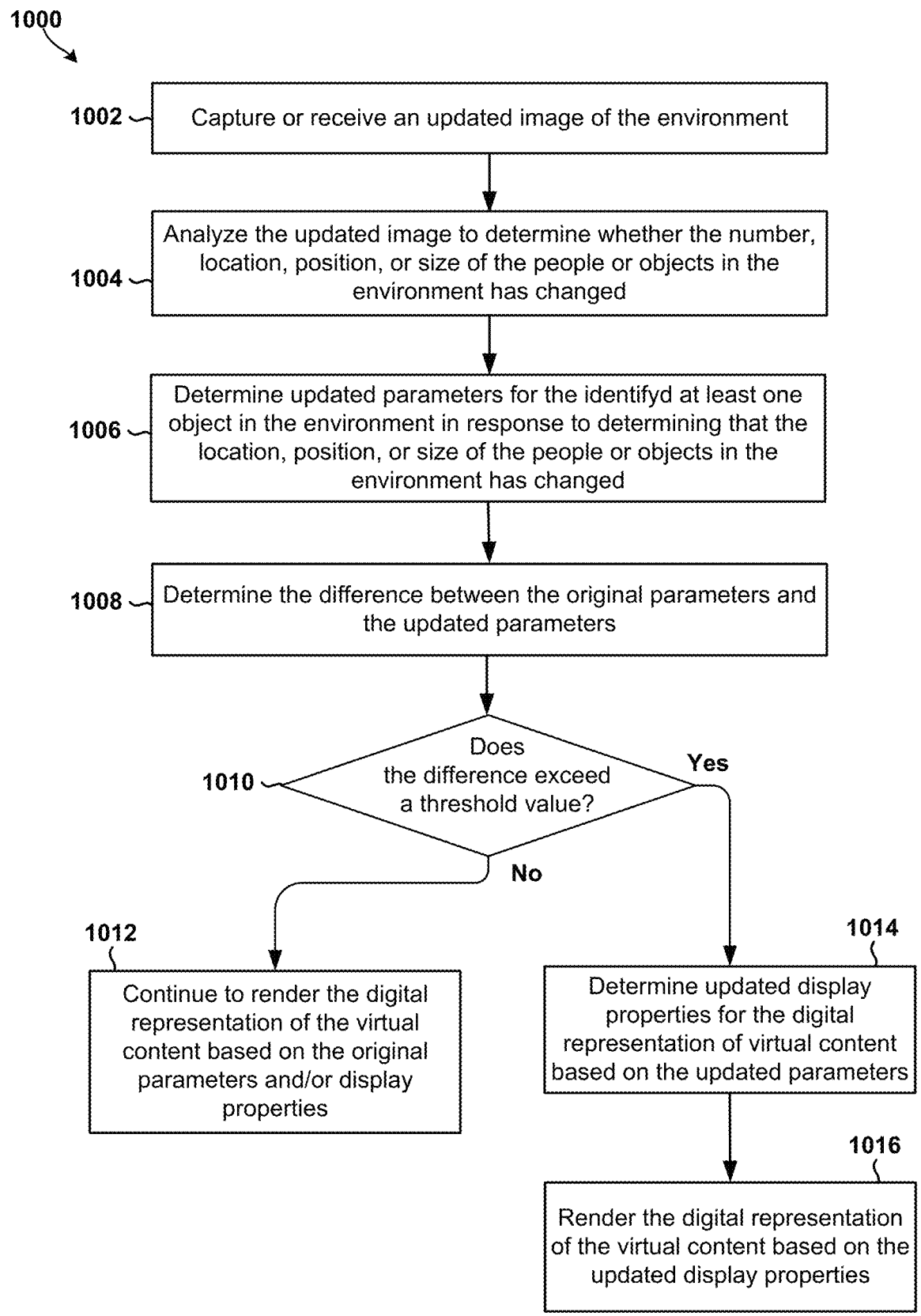
FIG. 10 is a process flow diagram illustrates a method of updating the display properties for a digital representation of a remote participant in accordance with an embodiment.

FIG. 10 illustrates a method 1000 of updating the display properties for a digital representation of virtual content, such as a remote participant, in accordance with an embodiment. The method 1000 may performed after the display properties of the digital representation are determined, the digital representation is rendered, or the virtual game has begun. All or portions of the method 1000 may be performed by a device processor, such as a processor (e.g., processor 114 illustrated in FIG. 1A) in a head mounted device worn by a co-located participant or a smartphone (e.g., processor 121 illustrated in FIG. 11).

In block 1002, the device processor may capture, generate or receive an updated image of the environment. For example, a camera on one or all of the devices may capture video of the environment and periodically provide image frames to the device processor (e.g., a smartphone processor, a processor of the head mounted device, a processor of a remote computing device, etc.). As another example, images of the environment may be captured periodically by one or more cameras positioned within the environment and in communication with the device processor.

In block 1004, the device processor may analyze the updated image to determine whether the number, location, position, or size of the people or objects in the environment has changed. Such operations may include determining boundaries of various participants and objects and comparing the determined boundaries to boundaries that were determined and stored in memory the last time that the display parameters were determined.

In block 1006, the device processor may determine updated parameters for the identified object in the environment in response to determining that the location, position, or size of the people or objects in the environment has changed.

In block 1008, the device processor may determine the difference between the original parameters and the updated parameters.

In determination block 1010, the device process may determine whether the difference between the original parameters and the updated parameters exceeds a threshold value. The threshold value may be set high enough so that the renderings are not adjusted when certain changes are detected, such as when a single participant stands up. Alternatively, or in addition, the threshold value may be set low enough so that the renderings are adjusted when certain changes are detected, such as when a majority of co-located persons stand or sit.

In response to determining that the difference between the original parameters and the updated parameters does not exceed the threshold value (i.e., determination block 1010="No"), the device processor may continue to render the digital representation of virtual content, such as a remote participant, based on the original parameters (e.g., parameters computed in block 606, etc.) and/or the original display properties (e.g., display properties computed in block 608, etc.) in block 1012.

In response to determining that the difference between the original parameters and the updated parameters exceeds the threshold value (i.e., determination block 1010="Yes"), the device processor may determine updated display properties for the digital representation based on the updated parameters in block 1014. For example, the device processor may perform one or more of the operations of any of methods 600, 700, 800 or 900 to determine the updated parameters in block 1014.

In block 1016, the device processor may render the digital representation of virtual content, such as a remote participant, based on the updated display properties.

Some embodiments may include methods of determining display properties for displaying images of one or more remote participants in a game, augmented reality game, training session, meeting, etc., such as in a virtual reality system by capturing (by a processor associated with a smartphone and/or head mounted device) an image of a game room/area, analyzing the captured image to identify people and objects in the game room/area, determining parameters for the identified people and objects, and determining display properties of a digital representation of virtual content, such as a remote participant, based on the determined parameters.

In some embodiments, determining the parameters for the identified people and objects may include determining the parameters based on one or more factors, in which the one or more factors include at least one or more of a fixed position factor, a size factor, a line-of-sight factor, a field-of-view factor, a spacing factor, an inter-person distance factor, a height factor, or a visibility factor.

Some embodiments may include assigning a priority to each of the one or more factors, in which determining display properties of the digital representation of the remote participant based on the determined parameters may include determining display properties of the digital representation of the remote participant based on priorities assigned to each of the one or more factors, and assigning a priority to each of the one or more factors may include assigning a higher priority to the fixed position factor, the size factor, or the line-of-sight factor than the priorities assigned to the field-of-view factor, the spacing factor, the inter-person distance factor, the height factor, and the visibility factor.

Some embodiments may include identifying other head mounted devices in the game room/area, and sending the determined parameters to the other smartphones and/or head mounted devices in the game room/area. Some embodiments may include receiving additional parameters from other smartphone and/or head mounted devices in the game room/area, in which determining display properties of the digital representation of the virtual content, such as a remote participant, based on the determined parameters may include determining display properties of the digital representation of the virtual content, such as a remote participant, based on the determined parameters and the additional parameters received from the other smartphones and/or head mounted devices in the game room/area. In some embodiments, determining display properties of the digital representation of the virtual content, such as a remote participant, based on the determined parameters may include negotiating the display properties for rendering the digital representation of the virtual content with other smartphones and/or head mounted devices in the game room/area to generate coordinated display properties.

Some embodiments may include using the coordinated display properties to render the digital representation of the virtual content, such as a remote participant, so that all co-located participants physically present in the game room/area perceive the virtual content to be in the same fixed position in the game room/area. Some embodiments may include using the coordinated display properties to intelligently size the digital representation of the remote participant so that the remote participant appears to be approximately the same size as co-located participants physically present in the game room/area. Some embodiments may include using the coordinated display properties to render the digital representation of the virtual content, such as a remote participant, so that the virtual content appears to be approximately the same height as an average height of co-located participants physically present in the game room/area.

Some embodiments may include using the coordinated display properties to render the digital representation of the virtual content, such as a remote participant, so that the virtual content appears to be approximately equidistant to co-located participants physically present in the game room/area. Some embodiments may include using the coordinated display properties to render the digital representation of the virtual content, such as a remote participant so that the virtual content appears to be anchored to an empty chair at a game table. Some embodiments may include capturing an updated image of the game room/area, analyzing the captured updated image to determine whether the number, location, position, or size of the people or objects in the game room/area has changed, determining updated parameters for the identified people and objects in the game room/area in response to determining that the location, position, or size of the people or objects in the game room/area has changed, determining whether a difference between the determined parameters and the determined updated parameters exceeds a threshold value, and determining updated display properties for the digital representation of the virtual content, such as a remote participant, in response to determining that the difference between the determined parameters and the determined updated parameters exceeds the threshold value.

Various embodiment methods may be implemented in a variety of personal computing devices, such as a laptop computer 1100 as illustrated in FIG. 11. A laptop computer 1100 will typically include a processor 1101 coupled to volatile memory 1102, and a large capacity nonvolatile memory, such as a disk drive 1104 of Flash memory. The laptop computer 1100 may also include a floppy disc drive 1105 coupled to the processor 1106. The computer receiver device 1100 may also include a number of connector ports or other network interfaces coupled to the processor 1101 for establishing data connections or receiving external memory receiver devices, such as a Universal Serial Bus (USB) or FireWire® connector sockets, or other network connection circuits for coupling the processor 1101 to a network (e.g., a communications network). In a notebook configuration, the computer housing includes the touchpad 1110, the keyboard 1112, and the display 1114 all coupled to the processor 1101. Other configurations of computing devices may include a computer mouse or trackball coupled to the processor (e.g., via a USB input) as are well known, which may also be used in conjunction with various embodiments.

The processors may be any programmable microprocessor, microcomputer or multiple processor chip or chips that may be configured by software instructions (applications) to perform a variety of functions, including the functions of the various embodiments described in this application. In some mobile devices, multiple processors may be provided, such as one processor dedicated to wireless communication functions and one processor dedicated to running other applications. Typically, software applications may be stored in the internal memory before they are accessed and loaded into the processor. The processor may include internal memory sufficient to store the application software instructions.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments may be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, functional components, functionality components, circuits, and algorithm operations described in connection with the embodiments disclosed herein may be implemented as electronic hardware, computer software, or combinations of both. To clearly illustrate this interchangeability of hardware and software, various illustrative components, blocks, functional components, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement the various illustrative logics, logical blocks, functional components, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. An apparatus for determining display properties for virtual content, comprising:
   at least one memory; and
   at least one processor coupled to the at least one memory, the at least one processor configured to:
      obtain an image of an environment;
      determine an object in the environment based on processing of the image of the environment;
      determine a position parameter based on the object, the position parameter being associated with a position of virtual content relative to multiple users associated with the virtual content;
      determine a location of a digital representation of the virtual content relative to the object based on the position parameter; and
      cause the digital representation of the virtual content to be displayed based on the location.

2. The apparatus of claim 1, wherein the at least one processor is configured to:
   assign a priority to the position parameter, wherein, to determine the location of the digital representation of the virtual content relative to the object based on the position parameter, the at least one processor is configured to determine the location of the digital representation of the virtual content relative to the object based on the priority assigned to the position parameter.

3. The apparatus of claim 1, wherein the at least one processor is configured to:
   determine one or more additional parameters based on the object, the one or more additional parameters including at least one of a size parameter, a line-of-sight parameter, a field-of-view parameter, a spacing parameter, an inter-person distance parameter, a height parameter, and a visibility parameter.

4. The apparatus of claim 3, wherein the at least one processor is configured to:
   assign a priority to the position parameter; and
   assign a priority to each respective parameter of the one or more additional parameters.

5. The apparatus of claim 1, wherein the at least one processor is configured to:
   send the location to at least one device.

6. The apparatus of claim 5, wherein the at least one processor is configured to:
  identify the at least one device in the environment, wherein the location is sent to the at least one device based on identifying the at least one device in the environment.

7. The apparatus of claim 1, wherein, to determine the location of the digital representation of the virtual content relative to the object based on the position parameter, the at least one processor is configured to:
  negotiate one or more locations for rendering the digital representation of the virtual content relative to the object with at least one other device in the environment.

8. The apparatus of claim 7, wherein, to negotiate the one or more locations for rendering the digital representation of the virtual content relative to the object with at least one device in the environment, the at least one processor is configured to:
  cause a first location to be sent to the at least one device;
  receive, from the at least one device, a response indicating a second location; and
  determine the location as the second location based on the response.

9. The apparatus of claim 1, wherein, to cause the digital representation of the virtual content to be displayed based on the location, the at least one processor is configured to:
  cause the digital representation of the virtual content to be displayed such that each user of the multiple users perceive the virtual content to be in a same position in the environment.

10. The apparatus of claim 1, wherein, to cause the digital representation of the virtual content to be displayed based on the location, the at least one processor is configured to:
  cause the digital representation of the virtual content to be displayed based on a size of a user of the multiple users physically present in the environment.

11. The apparatus of claim 1, wherein, to cause the digital representation of the virtual content to be displayed based on the location, the at least one processor is configured to:
  cause the digital representation of the virtual content to be displayed such that at least one user of the multiple users perceive the virtual content to be positioned between a first user physically present in the environment and a second user physically present in the environment.

12. The apparatus of claim 1, wherein the at least one processor is configured to:
  obtain an additional image of the environment;
  determine at least one property of the object has changed based on processing of the additional image;
  determine an updated parameter for the object in response to determining that the at least one property of the object has changed;
  determine whether a difference between the position parameter and the updated parameter exceeds a threshold value; and
  determine an updated location for the digital representation of the virtual content relative to the object based on determining that the difference between the position parameter and the updated parameter exceeds the threshold value.

13. The apparatus of claim 12, wherein the at least one property of the object includes at least one of a number, a location, a position, or a size of the object.

14. The apparatus of claim 1, wherein, to determine the location of the digital representation of the virtual content relative to the object based on the position parameter, the at least one processor is configured to:
  determine at least one location for each digital representation of each of a plurality of remote users.

15. A method of determining display properties for virtual content, comprising:
  obtaining an image of an environment;
  determining an object in the environment based on processing of the image of the environment;
  determining a position parameter based on the object, the position parameter being associated with a position of virtual content relative to multiple users associated with the virtual content;
  determining a location of a digital representation of the virtual content relative to the object based on the position parameter; and
  displaying the digital representation of the virtual content based on the location.

16. The method of claim 15, further comprising:
  assigning a priority to the position parameter, wherein determining the location of the digital representation of the virtual content relative to the object based on the position parameter comprises determining the location of the digital representation of the virtual content relative to the object based on the priority assigned to the position parameter.

17. The method of claim 15, further comprising:
  determining one or more additional parameters based on the object, the one or more additional parameters including at least one of a size parameter, a line-of-sight parameter, a field-of-view parameter, a spacing parameter, an inter-person distance parameter, a height parameter, and a visibility parameter.

18. The method of claim 17, further comprising:
  assigning a priority to the position parameter; and
  assigning a priority to each respective parameter of the one or more additional parameters.

19. The method of claim 15, further comprising:
  sending the location to at least one device.

20. The method of claim 19, further comprising:
  identifying the at least one device in the environment, wherein the location is sent to the at least one device based on identifying the at least one device in the environment.

21. The method of claim 15, wherein determining the location of the digital representation of the virtual content relative to the object based on the position parameter comprises:
  negotiating one or more locations for rendering the digital representation of the virtual content relative to the object with at least one other device in the environment.

22. The method of claim 21, wherein negotiating the one or more locations for rendering the digital representation of the virtual content relative to the object with at least one device in the environment comprises:
  sending a first location to the at least one device;
  receiving, from the at least one device, a response indicating a second location; and
  determining the location as the second location based on the response.

23. The method of claim 15, wherein displaying the digital representation of the virtual content based on the location comprises:
  displaying the digital representation of the virtual content such that each user of the multiple users perceive the virtual content to be in a same position in the environment.

24. The method of claim 15, wherein displaying the digital representation of the virtual content based on the location comprises:
    displaying the digital representation of the virtual content based on a size of a user of the multiple users physically present in the environment.

25. The method of claim 15, wherein displaying the digital representation of the virtual content based on the location comprises:
    displaying the digital representation of the virtual content such that at least one user of the multiple users perceive the virtual content to be positioned between a first user physically present in the environment and a second user physically present in the environment.

26. The method of claim 15, further comprising:
    obtaining an additional image of the environment;
    determining at least one property of the object has changed based on processing of the additional image;
    determining an updated parameter for the object in response to determining that the at least one property of the object has changed;
    determining whether a difference between the position parameter and the updated parameter exceeds a threshold value; and
    determining an updated location for the digital representation of the virtual content relative to the object based on determining that the difference between the position parameter and the updated parameter exceeds the threshold value.

27. The method of claim 26, wherein the at least one property of the object includes at least one of a number, a location, a position, or a size of the object.

28. The method of claim 15, wherein determining the location of the digital representation of the virtual content relative to the object based on the position parameter comprises:
    determining at least one location for each digital representation of each of a plurality of remote users.

29. A non-transitory computer-readable medium storing instructions that, when executed by a processor of a device, cause the device to perform operations comprising:
    obtaining an image of an environment;
    determining an object in the environment based on processing of the image of the environment;
    determining a position parameter based on the object, the position parameter being associated with a position of virtual content relative to multiple users associated with the virtual content;
    determining a location of a digital representation of the virtual content relative to the object based on the position parameter; and
    displaying the digital representation of the virtual content based on the location.

* * * * *